United States Patent [19]

Bohm et al.

[11] Patent Number: 5,705,007
[45] Date of Patent: Jan. 6, 1998

[54] METHOD FOR FORMING CORD-REINFORCED ELASTOMERIC STRIPE

[75] Inventors: Georg G. Bohm, Akron; James H. C. Yang, Cleveland, both of Ohio

[73] Assignee: Bridgestone Corporation, Tokyo, Japan

[21] Appl. No.: 576,605

[22] Filed: Dec. 21, 1995

[51] Int. Cl.[6] ............................................ B29D 30/38
[52] U.S. Cl. .................. 156/130.7; 152/548; 156/132; 156/133; 156/250; 156/308.2
[58] Field of Search ........................... 156/133, 134, 156/132, 123, 117, 397, 406.4, 130.7, 129, 250, 308.2; 152/548, 560, 558, 562

[56] References Cited

U.S. PATENT DOCUMENTS

| 1,193,715 | 8/1916 | Price ................................ 152/560 |
| 1,261,821 | 4/1918 | Kobiolke . |
| 1,295,014 | 2/1919 | Duysens ........................... 152/560 |
| 1,350,995 | 8/1920 | Graball . |
| 1,624,532 | 4/1927 | Castricum . |
| 1,624,533 | 4/1927 | Castricum . |
| 1,742,777 | 1/1930 | Midgley . |
| 1,770,895 | 7/1930 | Abbott, Jr. ..................... 152/548 |
| 1,918,553 | 7/1933 | Musselman . |
| 1,930,764 | 10/1933 | Mallory ............................ 154/14 |
| 3,509,929 | 5/1970 | Delobelle ....................... 152/560 |
| 3,523,844 | 8/1970 | Crimmins et al. ............... 156/52 |
| 4,096,010 | 6/1978 | Parham et al. ................. 156/179 |
| 4,738,738 | 4/1988 | Holroyd et al. ................ 156/129 |
| 4,877,468 | 10/1989 | Siegenthaler .................. 156/133 |
| 5,002,621 | 3/1991 | Ikeda ............................. 156/177 |
| 5,203,937 | 4/1993 | Goodfellow ................... 156/123 |
| 5,536,348 | 7/1996 | Chlebina et al. ............... 156/129 |

FOREIGN PATENT DOCUMENTS

| 373092 | 4/1923 | Germany . |
| 0987983 | 3/1965 | United Kingdom . |
| 2212441 | 7/1989 | United Kingdom . |
| WO 8400351 | 2/1984 | WIPO . |

Primary Examiner—Geoffrey L. Knable
Attorney, Agent, or Firm—Carmen S. Santa Maria

[57] ABSTRACT

A method and apparatus for forming contoured tire carcass strips having a body ply consisting of two strips of elastomeric material containing individually spaced reinforcing cords sandwiched therebetween, an innerliner, a pair of abrasive gum sections, and pairs of first and second sidewall sections. The carcass strip and reinforcing cords have a contour configuration with a wider central portion and a pair of outwardly flared end portions connected to the central portion by two intermediate portions. The transverse distances between the cords are equal, with the distances being greater at the central portion than the intermediate and end portions. A grooved forming plate has a plurality of grooves in one surface in the configured pattern that the cords will take when sandwiched in the body ply. The cords are placed in the grooves of the forming plate and have two strips of elastomeric material applied thereto by a pair of vacuum transfer plates and a press. The first sidewall sections and abrasive gum sections are applied to one surface of the body ply by another vacuum transfer plate to form a composite strip. The second sidewall sections are then applied to an opposite side of the body ply by another vacuum transfer plate to form the tire carcass strip. A plurality of the tire carcass strips then are applied in juxtaposition on a toroidal mandrel and assembled with a pair of tire bead assemblies to form a green tire carcass for subsequent placement in a tire-forming mold.

18 Claims, 19 Drawing Sheets

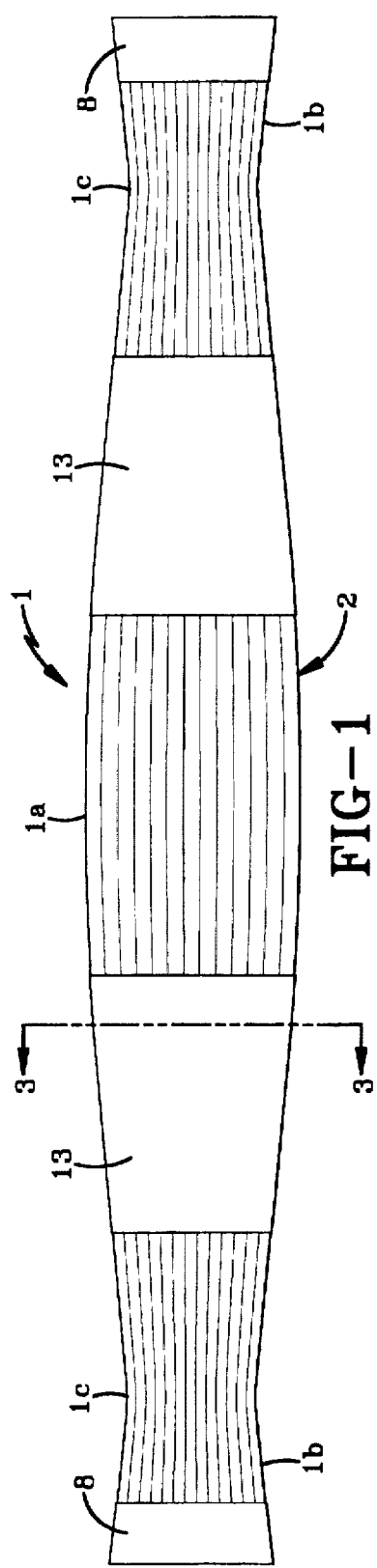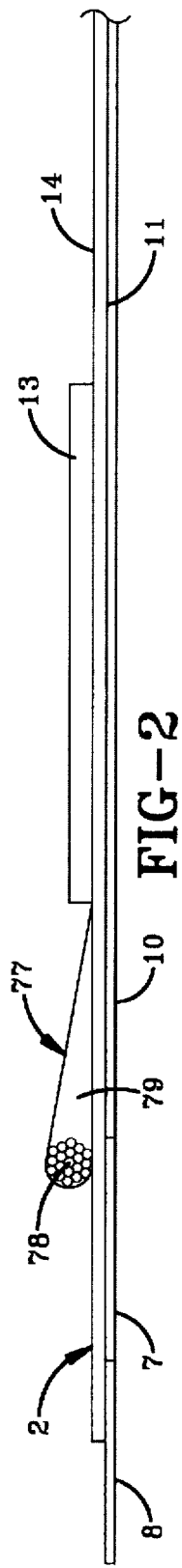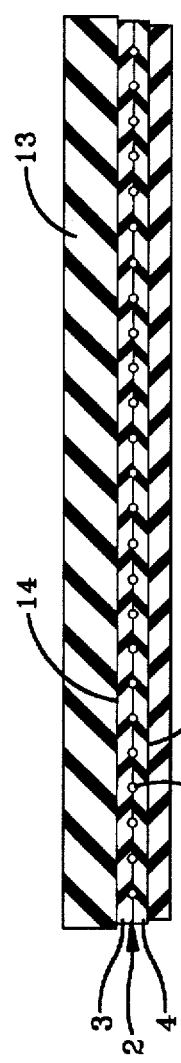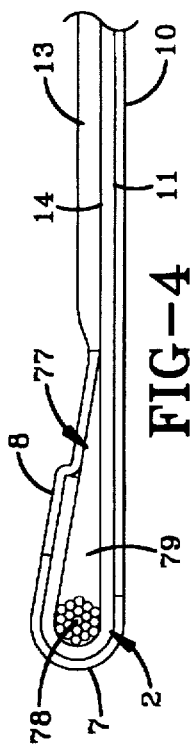

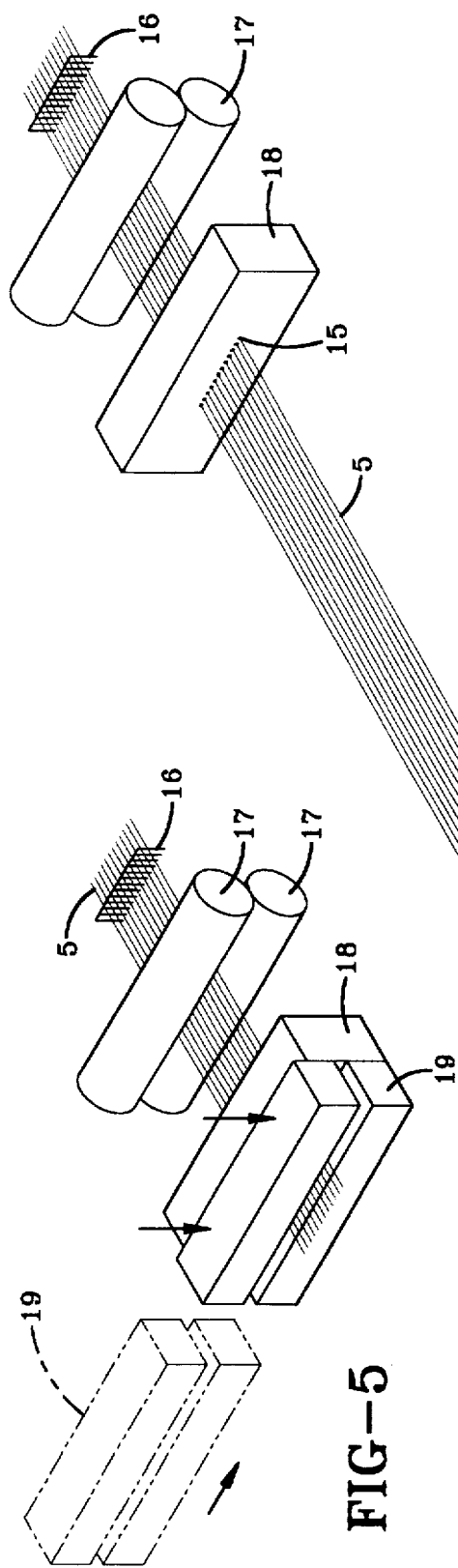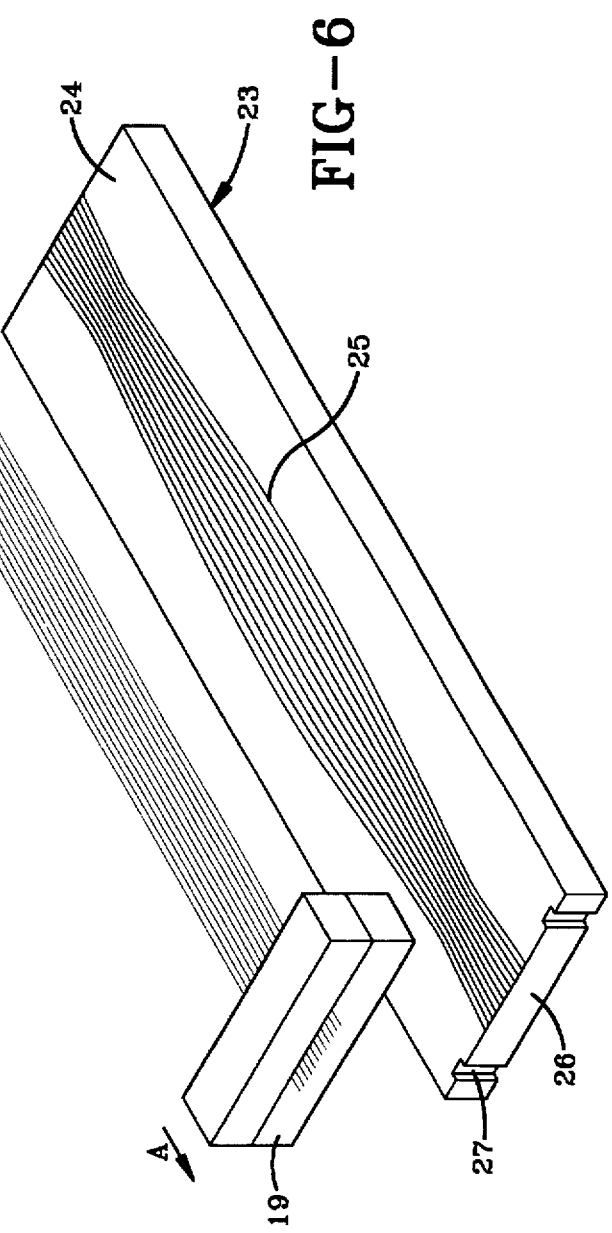

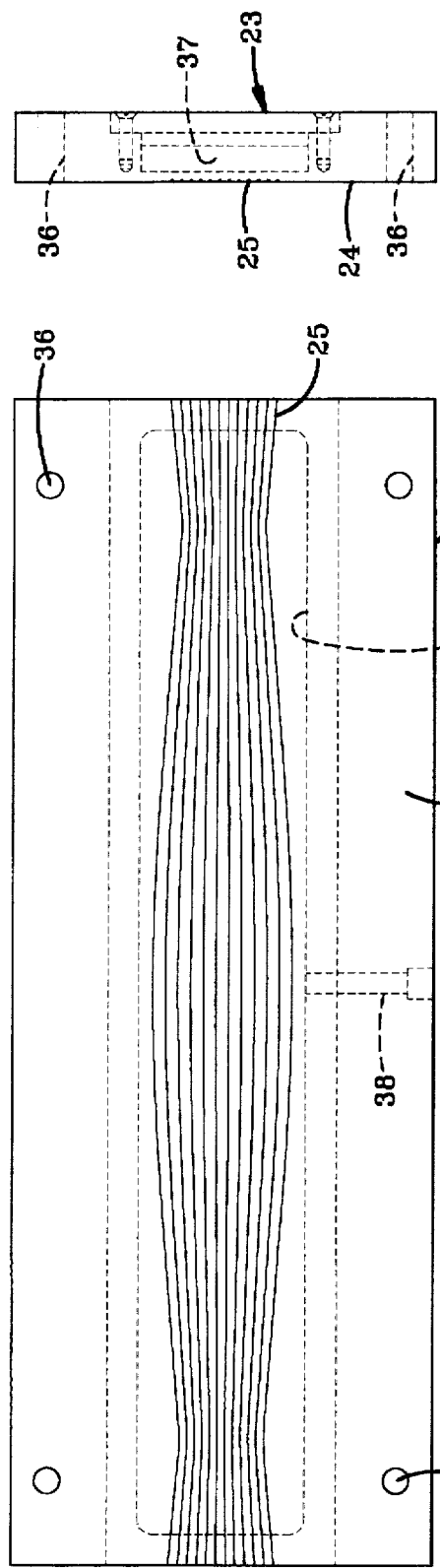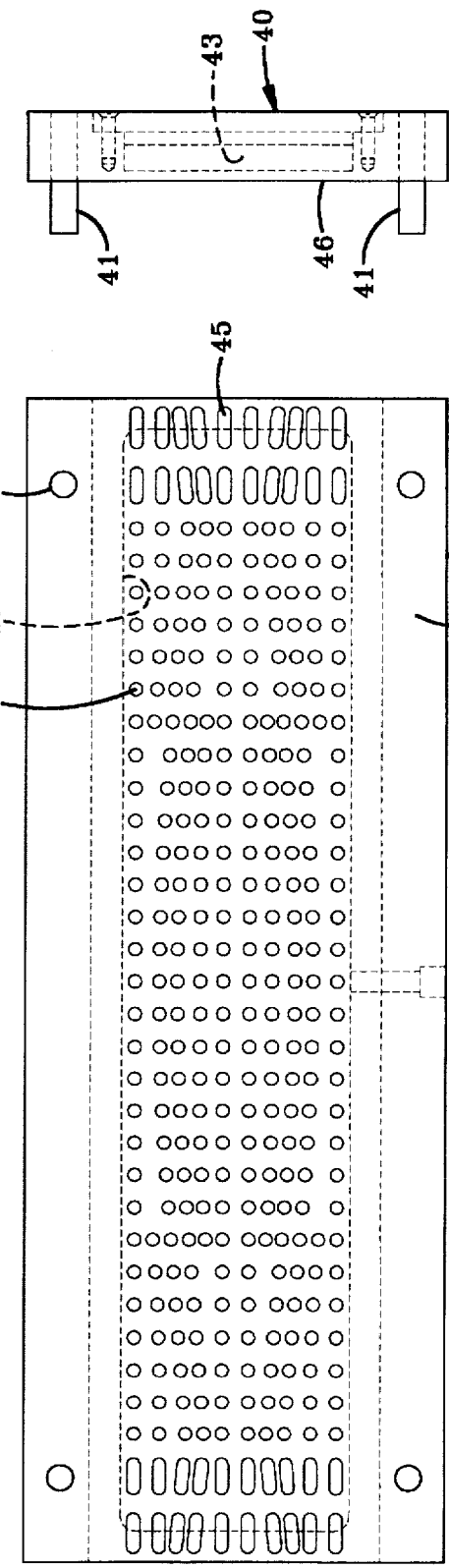

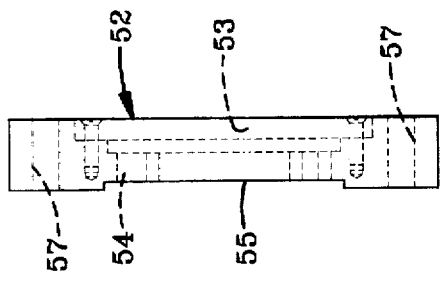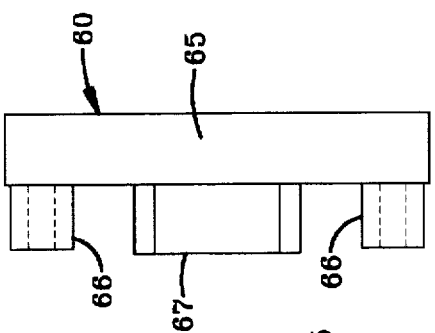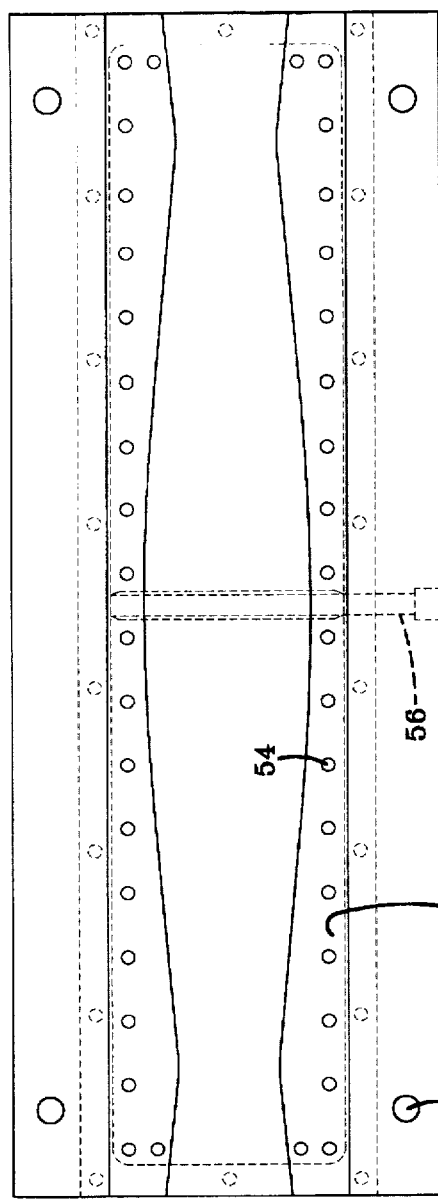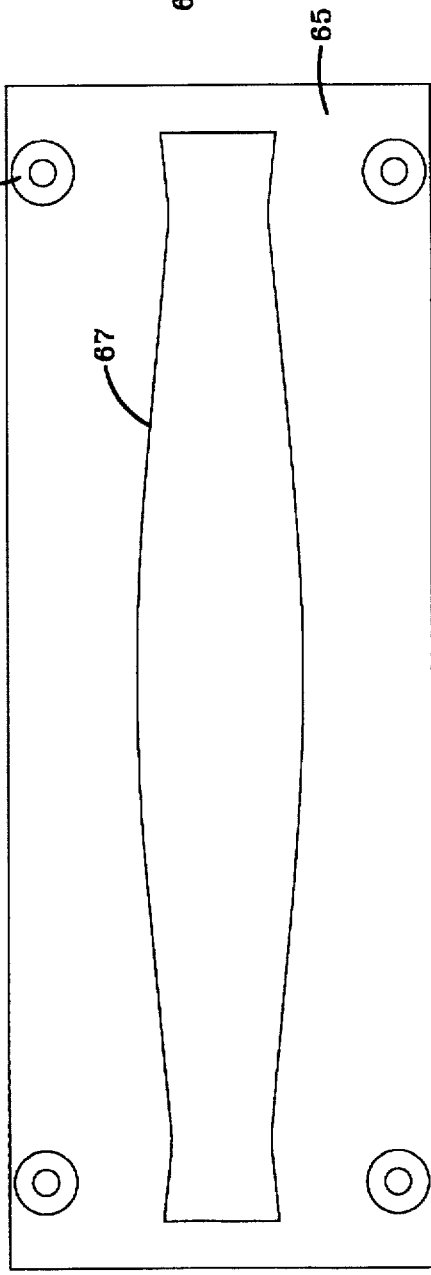

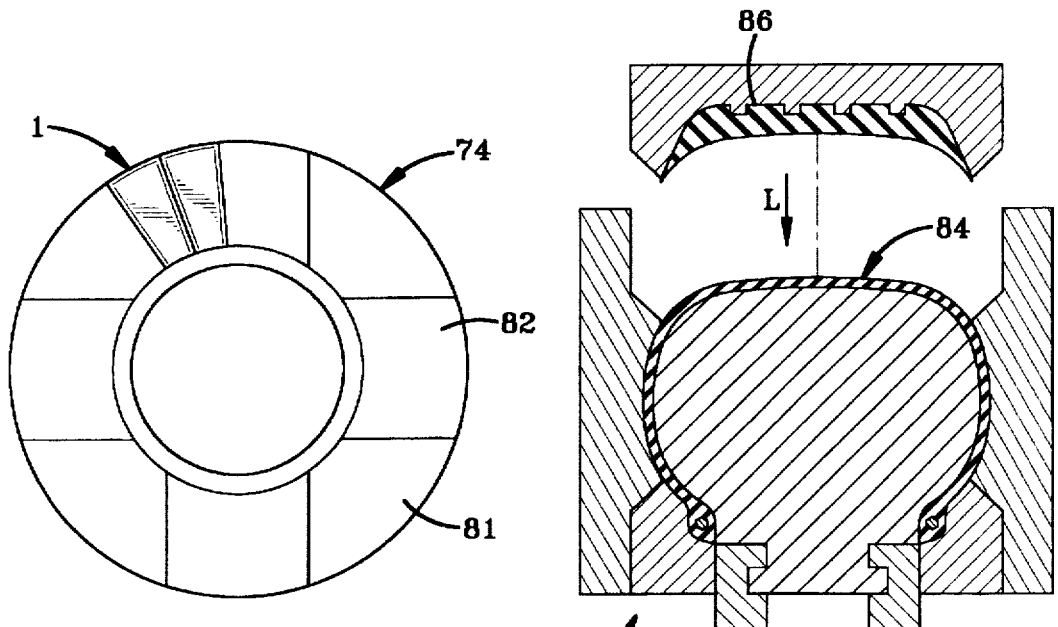
FIG-25
FIG-26
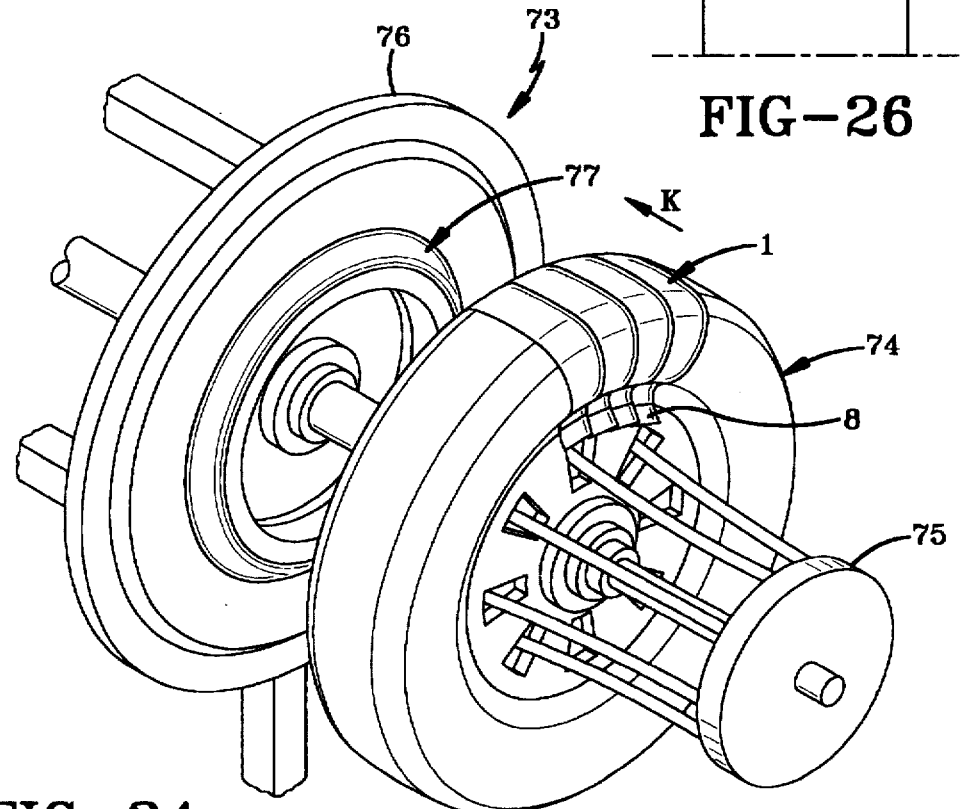
FIG-24

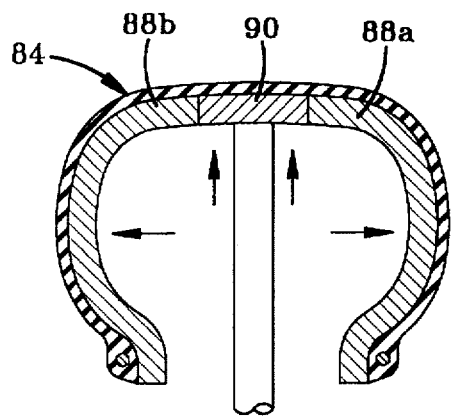
FIG-28
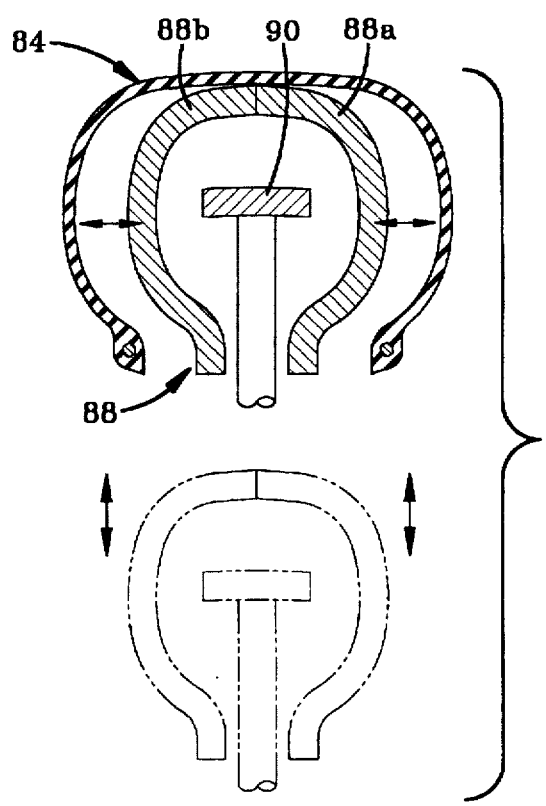
FIG-27
FIG-29
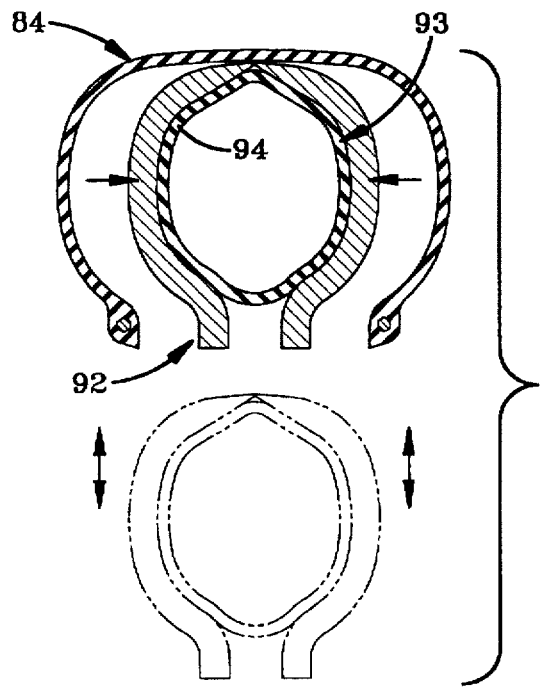
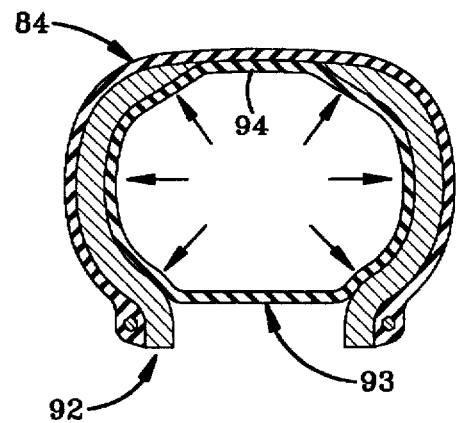
FIG-30

METHOD FOR FORMING CORD-REINFORCED ELASTOMERIC STRIPE

BACKGROUND OF THE INVENTION

1. Technical Field

The invention relates to the manufacture of cord-reinforced elastic strips, and, in particular, the strips in which the individual cords are arranged in a contoured spaced configuration wherein the transverse distances between the cords are equal, with the distances being greater at the central portion of the strip than at two flared end portions thereof. Even more particularly, the invention relates to the method and apparatus for manufacturing cord-reinforced elastomeric tire carcass strips wherein the reinforcing cords are positively positioned within the elastomeric strips, so that when the reinforcing strips are placed on a toroidal mandrel in a tire-building operation, the reinforcing cords embedded therein will be spaced throughout the toroidal shape of the pneumatic tire produced thereby.

2. Background Information

In the manufacture of pneumatic tires, numerous types of apparatus and methods are employed to form a green tire which is subsequently vulcanized in a mold into a finished tire. Many pneumatic tire constructions utilize various types and arrangements of reinforcing cords in the carcass thereof which extend from bead to bead of the tire. It is one of the main objects in the building of a tire that the individual reinforcing cords be maintained evenly spaced throughout the tire. This is difficult due to the toroidal cross-sectional shape of the final tire, since the cords after being placed in the uncured elastomeric strips from which the tire is constructed, are expanded radially outwardly prior to curing the tire. This results in movement of the reinforcing cords, which can result in irregular cord spacing, which in turn may effect the uniformity and performance characteristics of the tire.

Various methods have been developed to produce a pneumatic tire without the need of expansion of the carcass during manufacture by assembling the carcass components which are in strip form on a toroidally shaped mandrel. One of the key components to be assembled on the mandrel is the carcass ply containing the reinforcing cords. Various techniques have been proposed to accomplish this, but these involve very complicated or inadequate equipment and require considerable production time.

Various other prior art tire manufacturing processes and equipment using individual strips of material for forming the final product, as well as for forming other types of strip, material, are set forth in the patents discussed below.

U.S. Pat. No. 1,261,821 discloses a process for forming tire casings, in which the casings are formed from strips of leather that are impregnated with rubber and are adjacently positioned in either a circumferential, transverse or diagonal relationship to form the final toroidal shape of the tire.

U.S. Pat. No. 1,350,995 discloses another method of forming a tire in which an inner continuous circumferential strip is covered by transverse strips which extend from bead to bead with their longitudinal edges abutting.

U.S. Pat. No. 1,918,553 discloses another method of making a tire in which the reinforcing fabric is formed from a plurality of strips. The strips are trapezoidal in shape and are positioned adjacently around the circumference of the tire and are joined either in an abutting or an overlapping relationship.

U.S. Pat. No. 1,930,764 teaches the forming of a tire carcass from strips of rubberized fabric. The carcass is formed from a plurality of double wedge-shaped sections of rubber fabric that are folded over the periphery of a disc and extend downwardly on opposite sides of the disc.

U.S. Pat. No. 3,431,962 shows a reinforcement ply for a tire which is formed from adjacently positioned rubber strips. The ply is formed from strip elements which are positioned in a side-by-side relationship and are separated by spaces. The strip elements are formed from a large quantity of fibers that are impregnated with adhesive and then subsequently cured.

U.S. Pat. No. 4,801,344 discloses a method of manufacturing the reinforcement for tires by use of a continuous cord which is wound around two bead rings to define a cylinder by movement of the retention beads.

U.S. Pat. No. 5,002,621 discloses a method of making cord reinforced elastomeric strips in which the cords are reciprocatively moved across rubber sheets for coating the cords to form a wave-like cord pattern between a pair of the rubber sheets.

PCT Patent Application No. WO 89/04245 discloses the formation of reinforced polymeric strip material having cords embedded therein, in which two such strips are combined to form the final composite strip, wherein the cords have various configurations within the final strip.

The most closely related known prior art to the present invention is disclosed in U.K. Patent Application 2 212 441 A and in U.K. Patent No. 987,983. U.K. application 2 212 441 discloses a method and apparatus for forming tubular articles of variable diameters by reinforced rubber strips. A pair of grooved guide rolls uniformly space and guide individual strands of reinforcing cord toward a calender roll set where they are embedded into calendered strips of rubber at the nip between one of the calender rolls and the grooved guide roll. The strips containing the uniformly arranged reinforcing cords then are joined together to form a composite reinforced rubber strip which then is wound about a mandrel to form a tubular product of a desired axial width and diameter.

Although the apparatus of this U.K. application provides means for positively positioning the reinforcing cords into the elastomeric strip, it does so in an equally spaced parallel uniform pattern. Such an equally spaced pattern is not satisfactory in the reinforced elastomeric strips of the present invention, since the strips are ultimately mounted on a toroidal mandrel for the production of a pneumatic tire and such initial uniform parallel spacing of the cords would result in non-uniform spacing of the cords throughout the toroidally shaped tire.

U.K. Patent No. 987,983 discloses a method and apparatus for forming rubber strips containing reinforcing cords which are contoured in a somewhat similar manner as in the present invention so that the cords achieve the correct spacing throughout the toroidal configuration of a pneumatic tire. However, in the method of this U.K. patent, the reinforced rubber strips are placed upon a former, after which other components are then applied to the former to form the final tire carcass. This requires a series of operations to be performed at the former in building up the final tire carcass.

Other prior art methods and apparatus for forming cord-reinforced elastomeric strips are shown in the following patents.

U.S. Pat. No. 1,624,532 shows a cord guiding device which uses a guiding comb and a guiding platform, each of which has a plurality of spaced tines or teeth for guiding individual cords into a calender roll.

U.S. Pat. No. 1,742,777 shows another apparatus and method for incorporating a plurality of fabric cords in a spaced relationship in an elastomeric sheet by passing the cords through the nip of a plurality of calender rolls.

U.S. Pat. No. 3,523,844 discloses a method and apparatus for guiding a plurality of electrical conductors and placing the same in an insulating material for forming a ribbon cable.

U.S. Pat. No. 4,096,010 shows an apparatus and method for the manufacturing of optical fiber ribbons, which utilizes a vacuum-assisted fiber guide for accurately positioning the fibers in a precise parallel array in a supporting medium to form the optical fiber ribbon.

U.S. Pat. No. 5,002,621 discloses a method for producing tire-reinforcing members in which a plurality of individual reinforcing cords pass through a plurality of small apertures in a guide plate for arranging the cords in a predetermined relationship, after which the cords are reciprocatively moved into a calender rubber coating.

German Patent No. 373092 discloses a method and associated apparatus for producing a contoured strip containing reinforcing cords for subsequent incorporation into a tire carcass.

PCT Patent Application WO 84/00351 discloses a method and apparatus wherein a plurality of individual fibers are moved through guide apparatus for correct arrangement and placement in a heated resin to form a lamination.

SUMMARY OF THE INVENTION

Objectives of the invention include providing an improved method and apparatus for forming tire carcass strips of elastomeric material containing individually spaced reinforcing cords embedded therein, wherein the transverse distance between the cords are equal, with the distances being greater at a central portion of the strip than at two flared end portions and adjacent intermediate portions thereof, whereby the cords will lie in an equally spaced relationship when a plurality of the strips are placed in an abutting relationship on a toroidal mandrel when forming the carcass of a pneumatic tire; and in which the flared ends of the strips provide a bead turnup area on the strips.

A further objective is to provide such an improved method and apparatus in which the cords are positively placed and retained in their desired contoured configuration in the grooves of a forming plate prior to being embedded between a pair of strips of elastomeric material in a press to form a body ply.

Another objective is to provide such an improved method and apparatus in which the length and configuration of the grooved forming plate is equal to the strip to be produced thereby, so that the cord reinforcement pattern is formed precisely for each strip; and in which various patterns, including the size and lengths thereof, can be obtained by use of various lengths of such grooved forming plates, each of which will have a slightly different groove pattern formed in one planar surface thereof.

A further objective of the invention is to apply a strip of non-reinforced elastomeric material, which preferably is formed of a different compound than that of the reinforced body ply strip unto the cord reinforced body ply strip, such as the innerliner, together with a pair of abrasive gum sections and a pair of first sidewall sections, to form a composite strip to which a pair of second sidewall sections are subsequently attached to form a contoured tire carcass strip.

Another objective of the invention is to provide such a method and apparatus in which the longitudinal edges of the elastomeric strip containing the uniformly spaced individual reinforcing cords are trimmed so that the reinforced strip configuration assumes that of the configuration of the internal reinforcing cords; and in which the ends of the strip can be cut transversely to the desired longitudinal length.

A still further objective of the invention is to provide such an improved method and apparatus which achieves the stated objectives in an economical and efficient manner enabling the same to be utilized in the production of elastomeric strips for the subsequent manufacture of pneumatic tires.

These objectives and advantages are obtained by the improved method of the invention, the general nature of which may be stated as a method for forming a contoured tire carcass strip of elastomeric material containing reinforcing cords embedded in the elastomeric material in a contoured configuration having a central portion and outwardly flared end portions separated from said central portion by intermediate portions, said method including the steps of providing a grooved forming plate having a groove pattern formed therein by a plurality of grooves extending longitudinally in one surface of the plate wherein the groove pattern has the contoured configuration that the cords will take when embedded in the elastomeric material; placing a plurality of individual reinforcing cords into the grooves of the grooved forming plate to accurately position and space the cords; bringing a first strip of elastomeric material into contact with the spaced cords while the cords are in the grooves of the grooved forming plate and partially embedding the cords in said first strip of elastomeric material; bringing a second strip of elastomeric material into contact with the embedded cords to form a first body ply comprising said first and second strips of elastomeric material and the intervening reinforcing cords; assembling a composite strip comprising an innerliner, a pair of abrasive gum sections and a pair of first sidewall sections; bringing the first body ply into contact with the composite strip; and then bringing a pair of second sidewall sections into contact with the body ply to form the contoured tire carcass strip.

These objectives and advantages are further obtained by the improved apparatus of the invention, the general nature of which may be stated as apparatus for forming a tire carcass strip of elastomeric material containing reinforcing cords embedded in the elastomeric material in a contoured configuration having a central portion and outwardly flared end portions separated from said central portion by intermediate portions, said apparatus including a plurality of individual strands of reinforcing cords; a grooved forming plate formed within a plurality of grooves extending longitudinally in one surface of the plate wherein the groove pattern is substantially equal to the length of the reinforced strip and has the contoured configuration that the cords will take when embedded in the elastomeric material; means for placing the cords in the grooves of the forming plate; first transfer plate means for applying first and second strips of elastomeric material to the cords to form a body ply wherein the cords are sandwiched between the said first and second strips; second transfer plate means for applying an innerliner, abrasive gum sections and first sidewall sections to the body ply to form a composite strip; and third transfer plate means for applying second sidewall sections to the composite strip to form the tire carcass strip.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 1 is a top plan view of the fully assembled contoured reinforced multi-layer strip formed by the method of the present invention;

FIG. 2 is an enlarged side elevational view of a portion of the strip shown in FIG. 1;

FIG. 3 is an enlarged sectional view taken on line 3—3, FIG. 1;

FIG. 4 is an enlarged fragmentary view of an end portion of the multi-layer strip after formation of the tire bead area;

FIG. 5 is a fragmentary diagrammatic perspective view showing the start of the method of manufacturing the multi-layer strip of the present invention showing the body ply reinforcing cords moving between a pair of drive rollers, a comb, a cord guide and clamp;

FIG. 6 is a diagrammatic perspective view showing the alignment of the reinforcing cords by the apparatus of FIG. 5 prior to the placement of the cords in the contoured grooves of a grooved forming plate;

FIG. 20 is a top plan view of the grooved forming plate shown in FIGS. 6–14;

FIG. 20A is an end elevational view of the grooved plate of FIG. 20;

FIG. 21 is a top plan view of the first vacuum plate shown in FIGS. 11–17;

FIG. 21A is an end elevational view of the vacuum plate of FIG. 21;

FIG. 22 is a top plan view of the second vacuum plate shown in FIGS. 15 and 16;

FIG. 22A is an end elevational view of the second vacuum plate of FIG. 22;

FIG. 23 is a top plan view of the trimming mechanism shown in FIG. 17;

FIG. 23A is an end elevational view of the trimming mechanism of FIG. 23;

FIG. 24 is a diagrammatic perspective view of a plurality of the reinforced strips produced by the method shown in FIGS. 5–19 placed on a tire-building mandrel of a tire-building machine adjacent a bead-applying member;

FIG. 25 is a diagrammatic side elevational view of a pair of the strips placed on a collapsible mandrel, as shown in FIG. 24;

FIG. 26 is a partially exploded sectional view showing the tire carcass produced by the tire-building machine of FIG. 24 placed in a mold prior to placing a tread belt assembly in the mold;

FIG. 27 is a diagrammatic sectional view showing the tire carcass formed by the tire-building machine of FIG. 24 placed on a collapsible mandrel shown in a collapsed condition;

FIG. 28 is a sectional view similar to FIG. 27 showing the mandrel of FIG. 27 in an expanded position;

FIG. 29 is a diagrammatic sectional view showing the tire carcass formed by the tire-building machine of FIG. 24 being placed on an expandable mandrel containing an air bag, with the air bag shown in a collapsed position; and FIG. 30 is a diagrammatic sectional view similar to FIG. 29 showing the air bag in an inflated position.

Similar numerals refer to similar parts throughout the drawings.

DESCRIPTION OF THE PREFERRED EMBODIMENT

Figure 7:
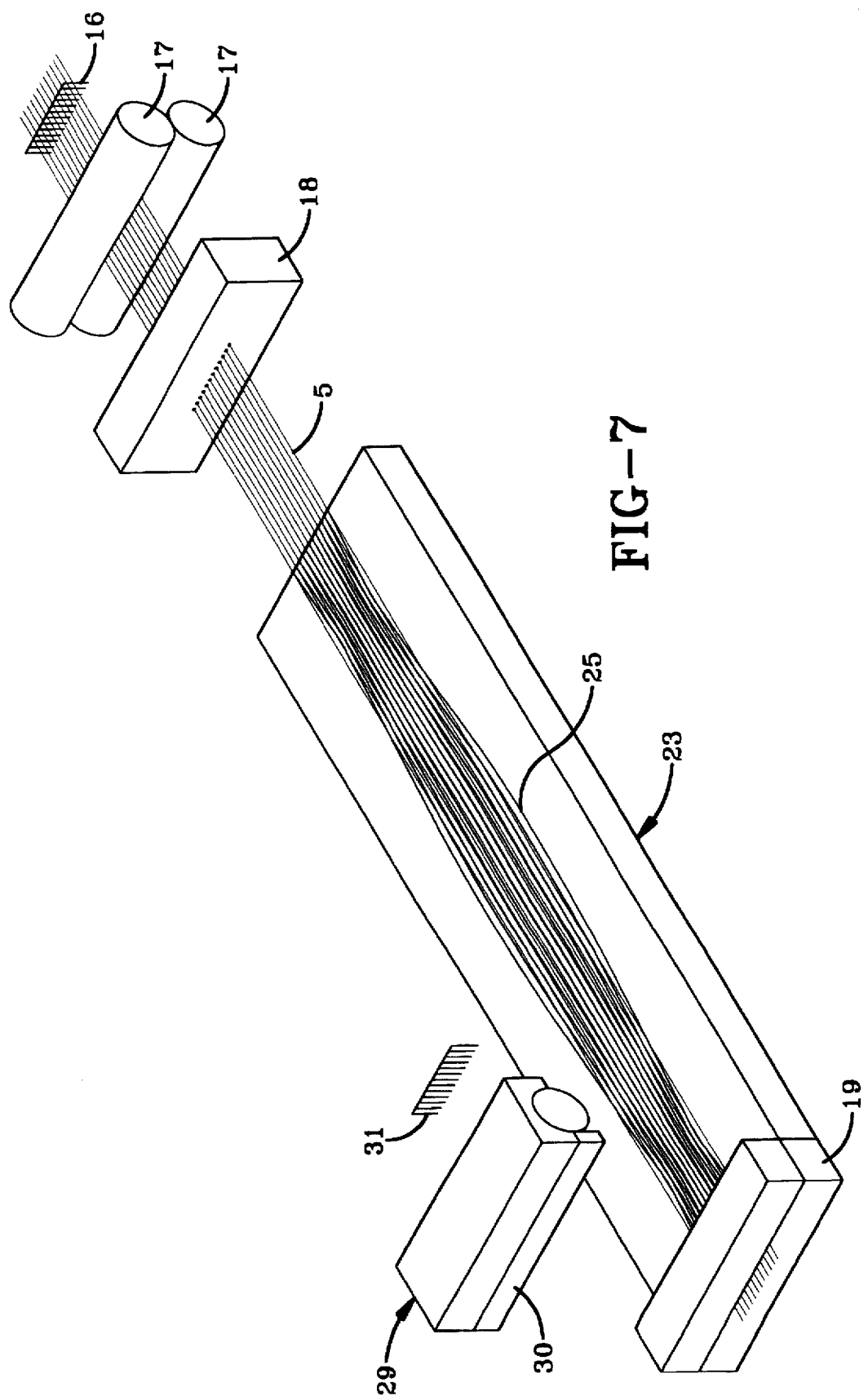
FIG. 7 is a diagrammatic perspective view showing the leading ends of the reinforcing cords being clamped at the end of the forming plate prior to the cords being placed in the plate grooves by a roller and guide comb.

The improved tire carcass strip produced by the method and apparatus of the present invention is indicated generally at 1, and is shown particularly in FIGS. 1–3. Strip 1 includes a body ply 2 consisting of a pair of sheets or layers 3 and 4 of elastomeric material having a plurality of individually spaced reinforcing cords 5 sandwiched therebetween in a contoured configuration. The cords are equally spaced in the transverse position throughout the longitudinal length of the strip with the spacing being greater at a central portion 1a than at two flared end portions 1b, and with the transverse spacing being the smallest at the intermediate portions 1c (FIG. 1).

Carcass strip 1 further includes a pair of abrasive gum strip sections 7 (FIG. 2) and a pair of spaced first sidewall sections 8 mounted adjacent to abrasive gum sections 7 and extending outwardly beyond the ends of body ply 2. A second strip of elastomeric material 10 extends between abrasive gum strip sections 7 and contain no internal reinforcement, and, preferably, will be of a different chemical compound than that of the elastomeric material of body ply layers 3 and 4, and, preferably, forms the innerliner of the tire carcass strip. Elastomeric strip 10, abrasive gum strip sections 7 and first sidewall sections 8 are all applied to a first planar side 11 of body ply 2.

A pair of second sidewall sections 13, which have a truncated configuration, as shown particularly in FIG. 1, as do first sidewall sections 8, are mounted in a spaced relationship on a second planar side 14 of body ply 2. The various materials of elastomeric layers 3 and 4, abrasive gum strip sections 7, and first and second sidewall sections 8 and 13 preferably are the same as those used in the formulation of the similar components of a tire when constructed of a plurality of sheets placed on a tire-building drum, and are readily known to those skilled in the tire compounding and material art, and, therefore, are not specified herein.

The method of the present invention for producing tire carcass strip 1 discussed above, is shown particularly in FIGS. 5–19, and discussed herein below. Furthermore, the improved apparatus of the present invention for forming tire carcass strip 1 is shown in FIGS. 5–23A.

Referring to FIGS. 5 and 6, a plurality of usual individual reinforcing cords 5, used in the production of pneumatic tires, are arranged in a parallel spaced relationship and properly spaced by a guiding and separating comb 16, and pass between a pair of drive rolls 17 and a guide block 18 which will be formed with a plurality of openings 15 arranged in a linear spaced relationship, with the front ends of cords 5 being secured in a clamp 19.

As shown in FIG. 6, clamp 19 will be moved by an appropriate mechanism forwardly in the direction of arrow A, bringing a plurality of reinforcing cords 5 in their spaced relationship above a grooved forming plate, indicated generally at 23. Forming plate 23 preferably has an elongated generally flat planar configuration, with a top planar surface 24, and is formed with a plurality of individual grooves 25 which are arranged in a contoured configuration, the same as the contoured configuration which cords 5 will achieve when embedded in body ply elastomeric strips 3 and 4, as shown in FIGS. 1 and 3.

Figure 8:
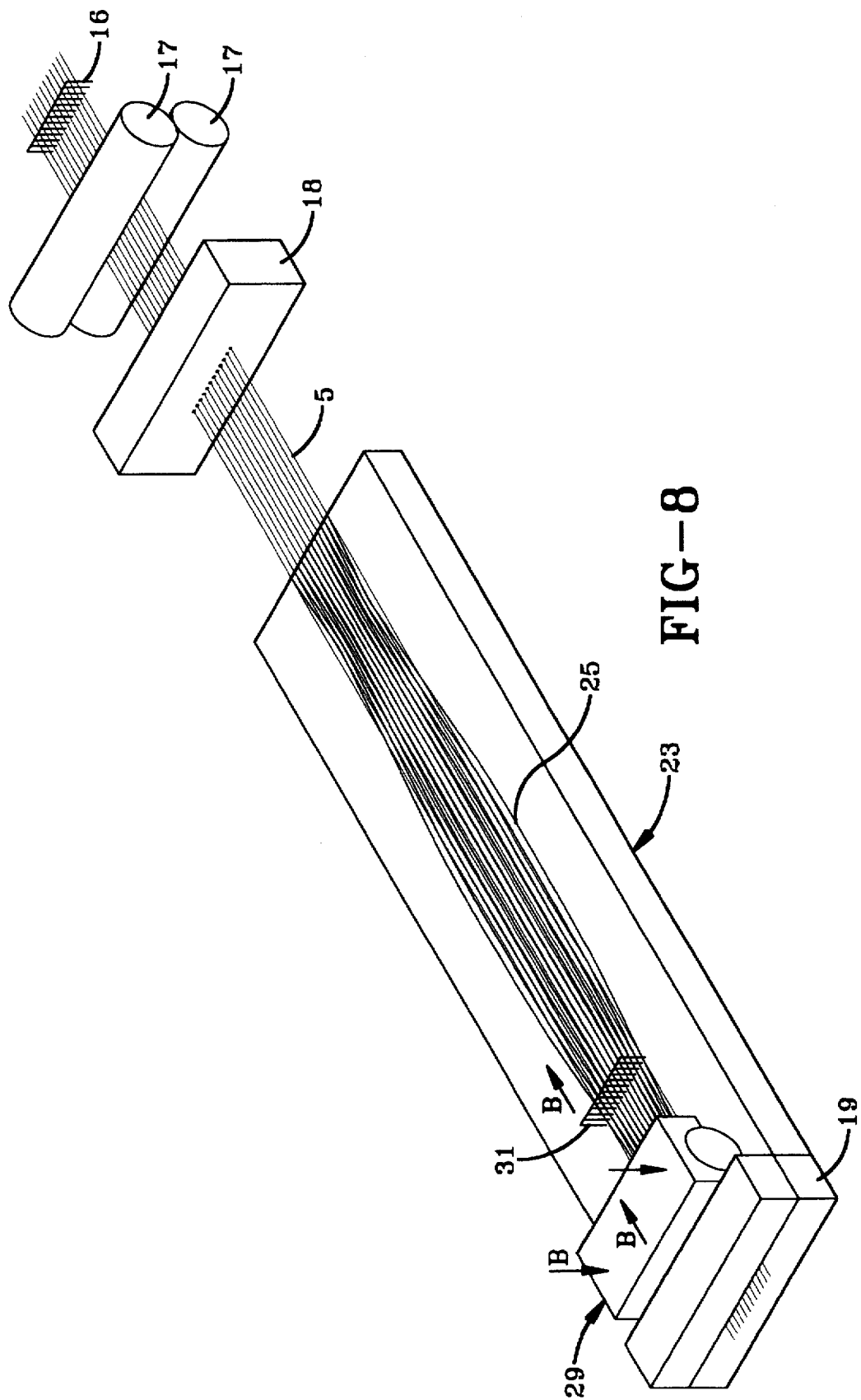
FIG. 8 is a diagrammatic perspective view showing the step of placing the reinforcing cords in the contoured grooves of the grooved forming plate with a roller and comb.

Referring to FIG. 7, clamp 19 and cord guide 18, as well as drive rollers 17, will be lowered by an appropriate mechanism (not shown) so that clamp 19 is engaged and mated with a front end 26 of groove-forming plate 23, which will have some type of registration grooves 27 or the like, for aligning and positioning clamp 19 therewith. This places the parallel spaced tensioned cords 5 over grooves 25 of plate 23. Next, a guide roller 29, which may have a flexible trailing wiper 30 and a guide comb 31, is lowered into engagement with cords 5, as shown in FIG. 8 and indicated by arrows B, and by the movement of guide roller 29 and comb 30 in the direction of arrows C from the position of FIG. 8 to that of FIG. 9, will place the individual heretofore parallel cords 5, into contoured plate grooves 25, whereby the cords are arranged in the desired contoured configuration, as shown in FIGS. 9 and 10.

Figure 9:
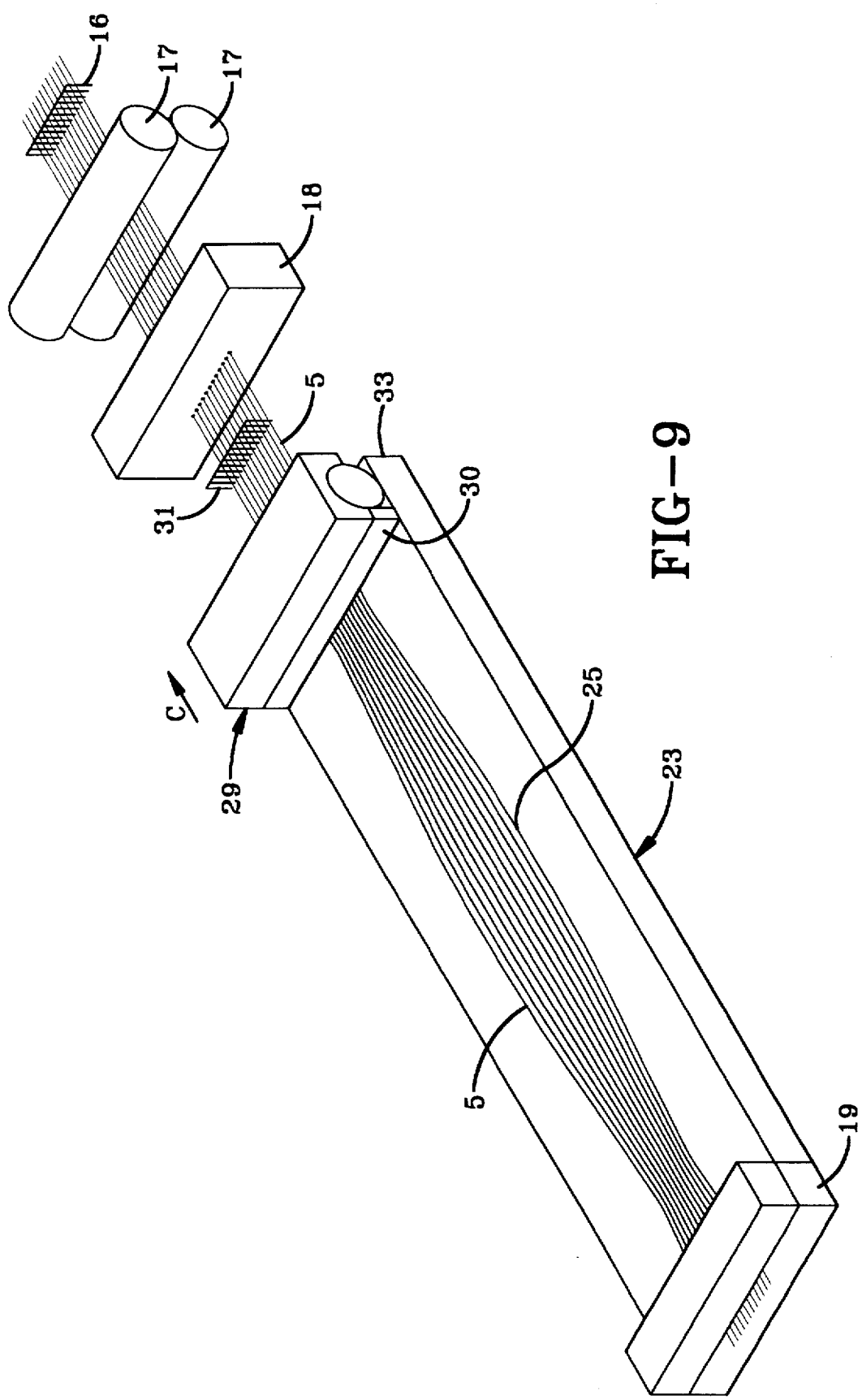
FIG. 9 is a diagrammatic perspective view showing the completion of the placement of the reinforcing cords in the contoured grooves of the forming plate of FIG. 8.
Figure 10:
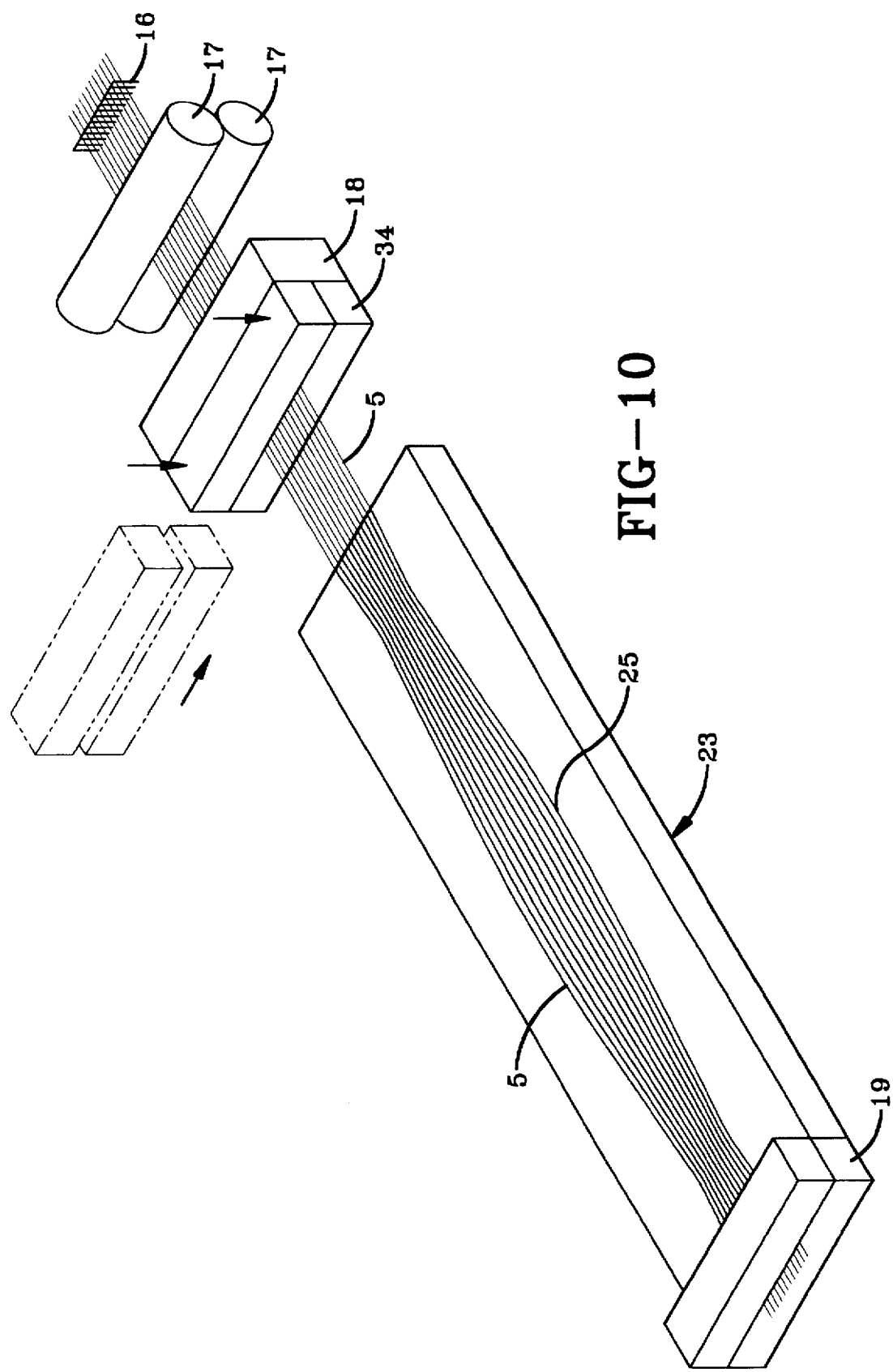
FIG. 10 is similar to FIGS. 8–9 showing the trailing ends of the cords being clamped and held in position after the placement of the reinforcing cords in the contoured grooves of the forming plate.

Upon guide roller 29 and comb 31 reaching the end 33 of plate 23, as shown in FIG. 9, a clamp 34 will engage cords 25 (FIG. 10), securing the trailing ends of the cords in a secured position, maintaining the cords under sufficient tension so that the cords remain in the individual grooves 25 of plate 23. This positions the cords and clamp 34 in the position shown in FIGS. 5 and 10 for the start of another operation for placing cords 5 in the grooves of the same or another grooved forming plate 23 for forming another tire carcass strip 1.

The particular configuration and construction of plate 23 is shown in FIGS. 20–20A. Plate 23 is formed with a plurality of alignment holes 36 for receiving positioning pins or other mechanisms for securing plate 23 in a desired position, and for subsequent movement and manipulation of the plate. Plate 23 also is formed with a vacuum chamber 37 which is connected through an inlet opening 38 to a source of negative pressure for forming a vacuum on each of the individual grooves 25 which communicate through a plurality of holes (not shown) to vacuum chamber 37. The use of the negative pressure will ensure that the cords are maintained in their individual grooves after being placed therein by guide roll 29 and comb 31, as shown in FIGS. 7–9. The cords when retained in grooves 25 will extend a short distance above planar surface 24 so as to partially embed into the elastomeric material, as described below.

Figure 11:
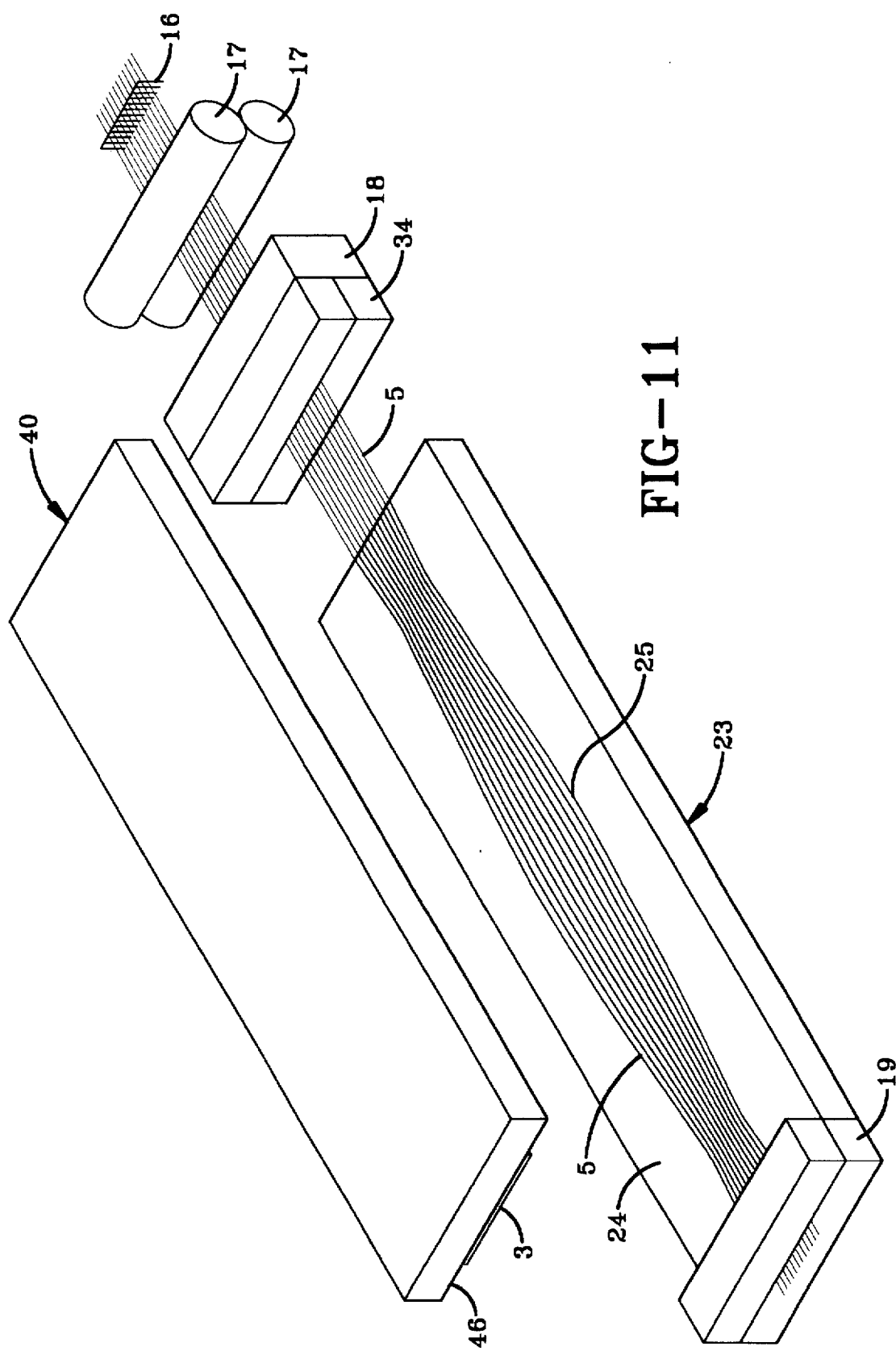
FIG. 11 is a diagrammatic perspective view showing a first vacuum plate moving a first body ply adjacent to the grooved forming plate containing the reinforcing cords.
Figure 12:
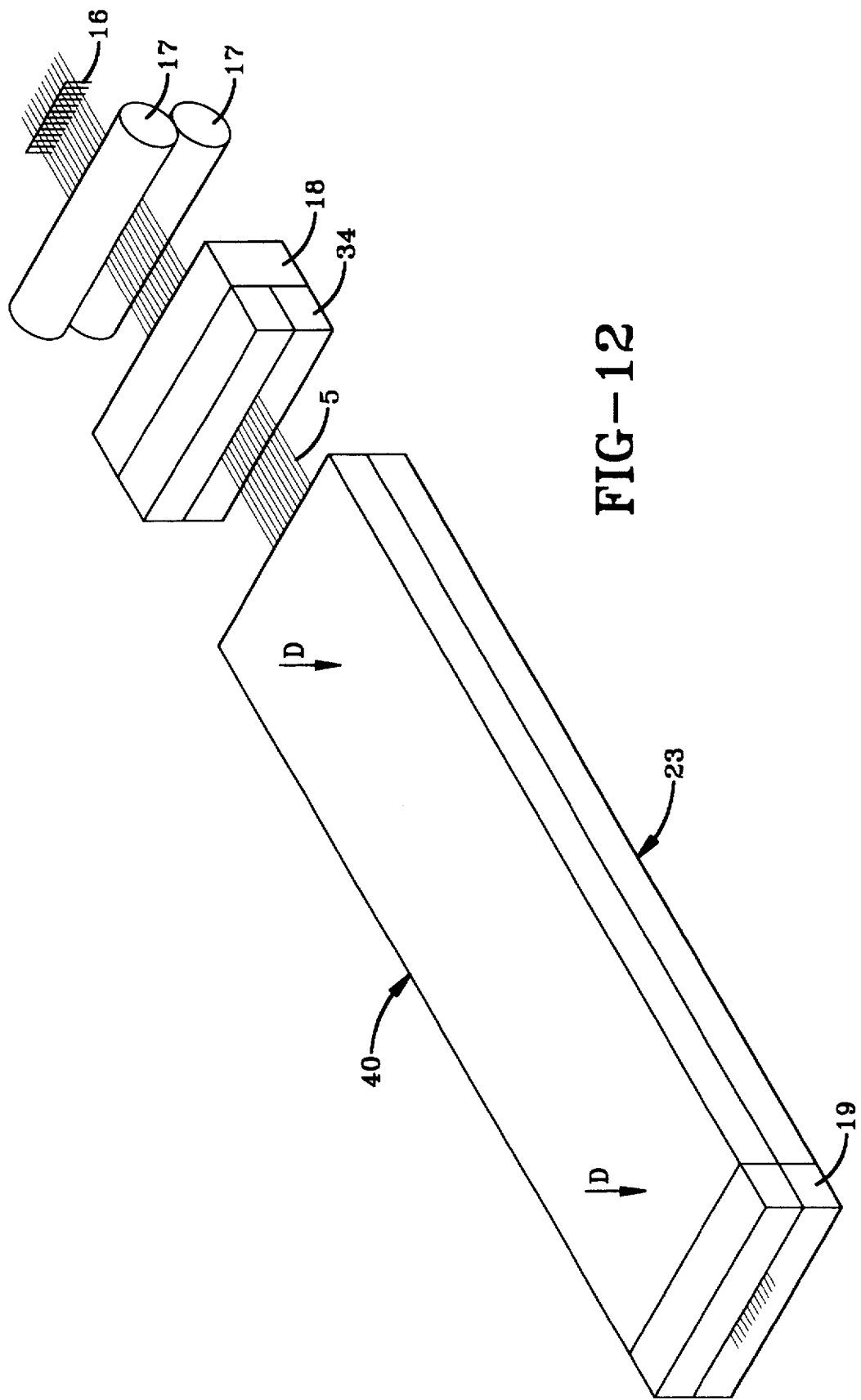
FIG. 12 is a diagrammatic perspective view showing the first body ply being brought into contact with the contoured array of reinforcing cords contained in the grooved forming plate.

Referring to FIG. 11, a first vacuum plate 40, which preferably is a generally flat rectangular-shaped plate similar in size and configuration to grooved forming plate 23, brings first body ply elastomeric strip or layer 3 into position for engagement with cords 5, as shown in FIG. 12. Vacuum plate 40 is shown particularly in FIGS. 21–21A, and includes a plurality of alignment and transfer holes 41 similar to holes 36 of plate 23. A vacuum chamber 43 is formed within plate 40 and has a plurality of circular holes 44 and elongated end holes or slots 45 which provide communication between planar recessed surface 46 and chamber 43 for applying a vacuum to retain and hold elastomeric strip 3 thereto, as shown in FIG. 11.

Plate 40 is placed by an appropriate transfer mechanism in juxtaposition with plate 23, as shown by arrows D in FIG. 12, which will bring cords 5 into engagement with strip 3 and will partially embed the cords therein. As discussed above, the depth of grooves 25 is such that an upper portion of the cords will extend above plate surface 24 so that contact is made with elastomeric strip 3, enabling the cords to become partially embedded therein when pressure is applied between plates 23 and 40, as shown in FIG. 12. Tension is maintained on the cords by clamp 34 so that the cords remain in their desired contoured configuration within grooves 25.

Figure 13:
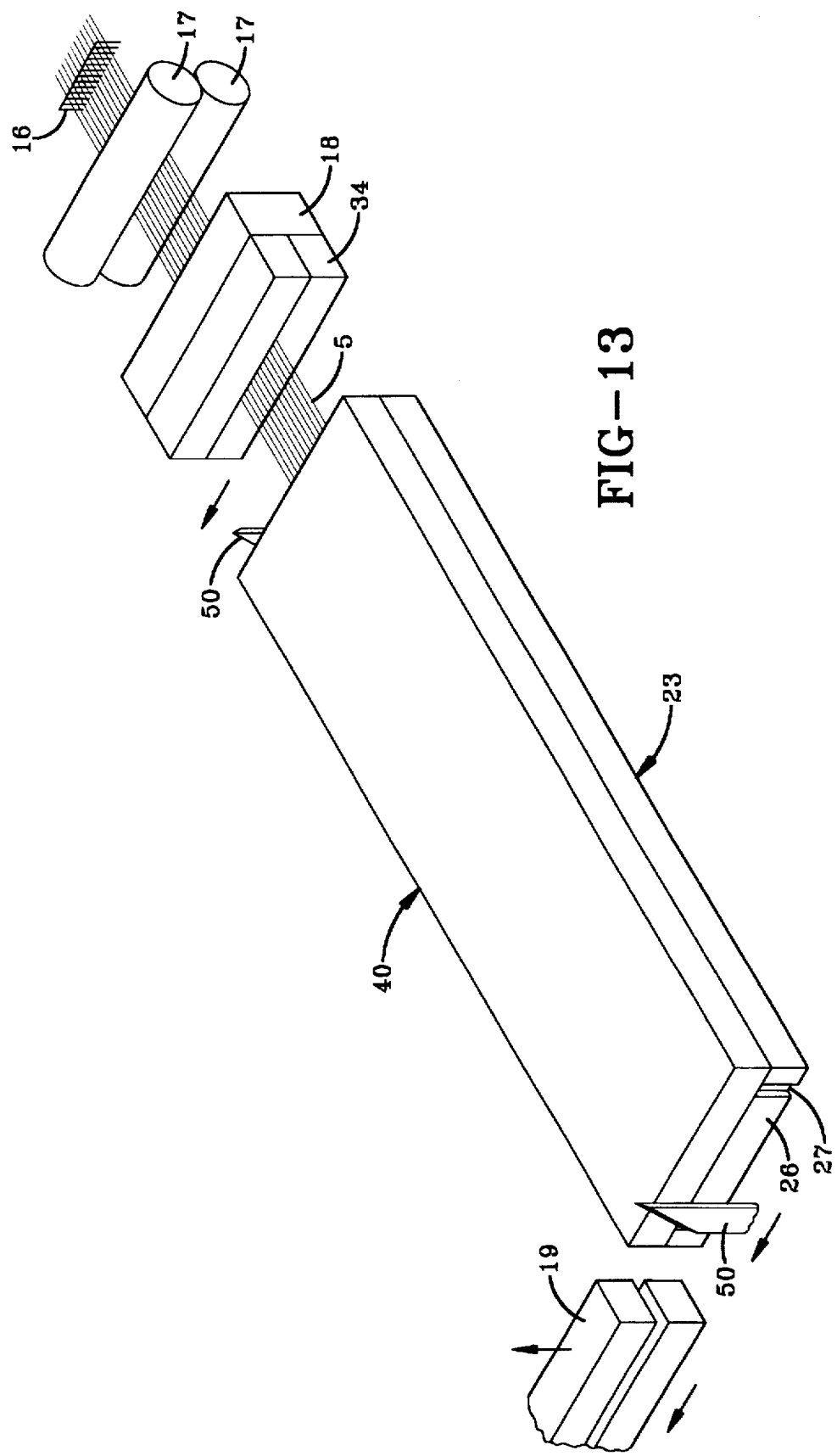
FIG. 13 is a diagrammatic perspective view similar to FIG. 12 showing the step of trimming the ends of the reinforcing cords.

Referring to FIG. 13, a pair of cutting blades 50, or other type of cutting mechanism, will sever cords 5 which extend beyond the ends of joined plates 23 and 40, enabling plates 23 and 40 to be moved to another location.

Figure 14:
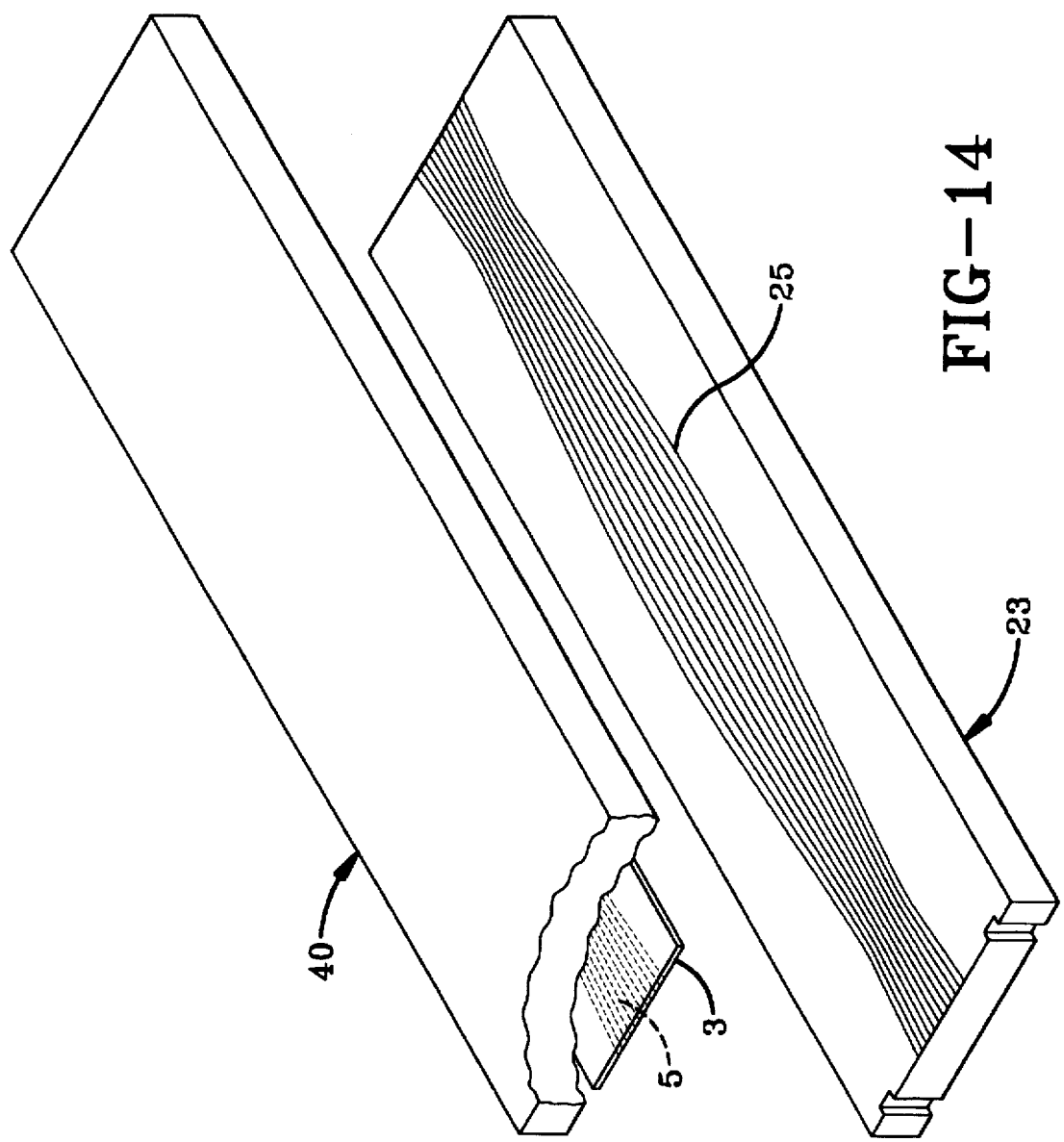
FIG. 14 is a diagrammatic perspective view, with portions broken away, showing the first body ply containing the reinforcing cords being transferred from the grooved forming plate by the first vacuum plate.

Referring to FIG. 14, plate 40 is removed from plate 23 and carries with it by the vacuum applied thereto, elastomeric layer 3 having cords 5 partially embedded therein in the desired contoured configuration, determined by the pattern of grooves 25 in plate 23.

Figure 15:
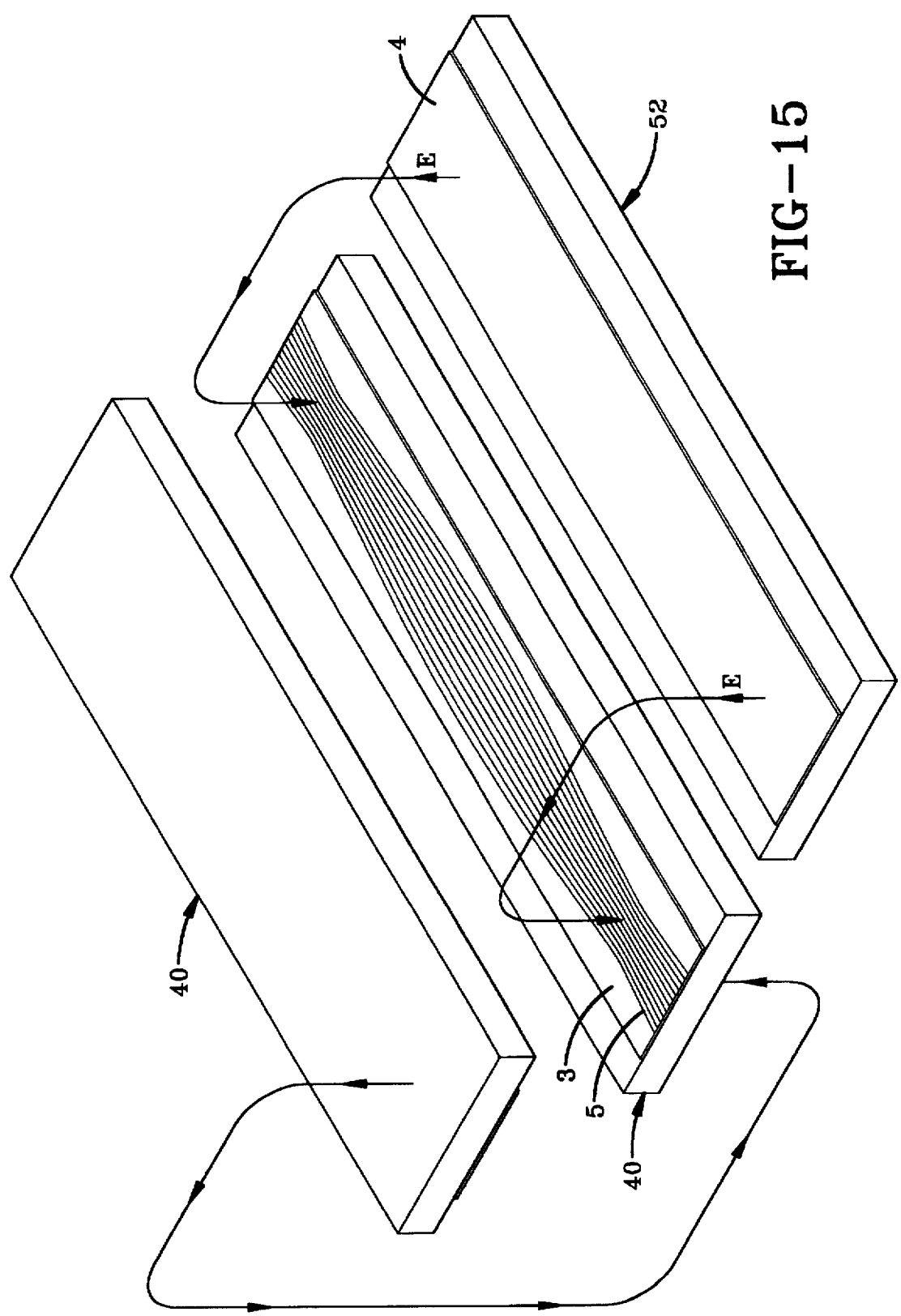
FIG. 15 is a diagrammatic perspective view showing the first vacuum plate containing the reinforcing cords and first body ply being rotated 180°' with a second vacuum plate containing a second layer of body ply being brought into position for subsequent joinder with the first body ply and reinforcing cords.
Figure 16:
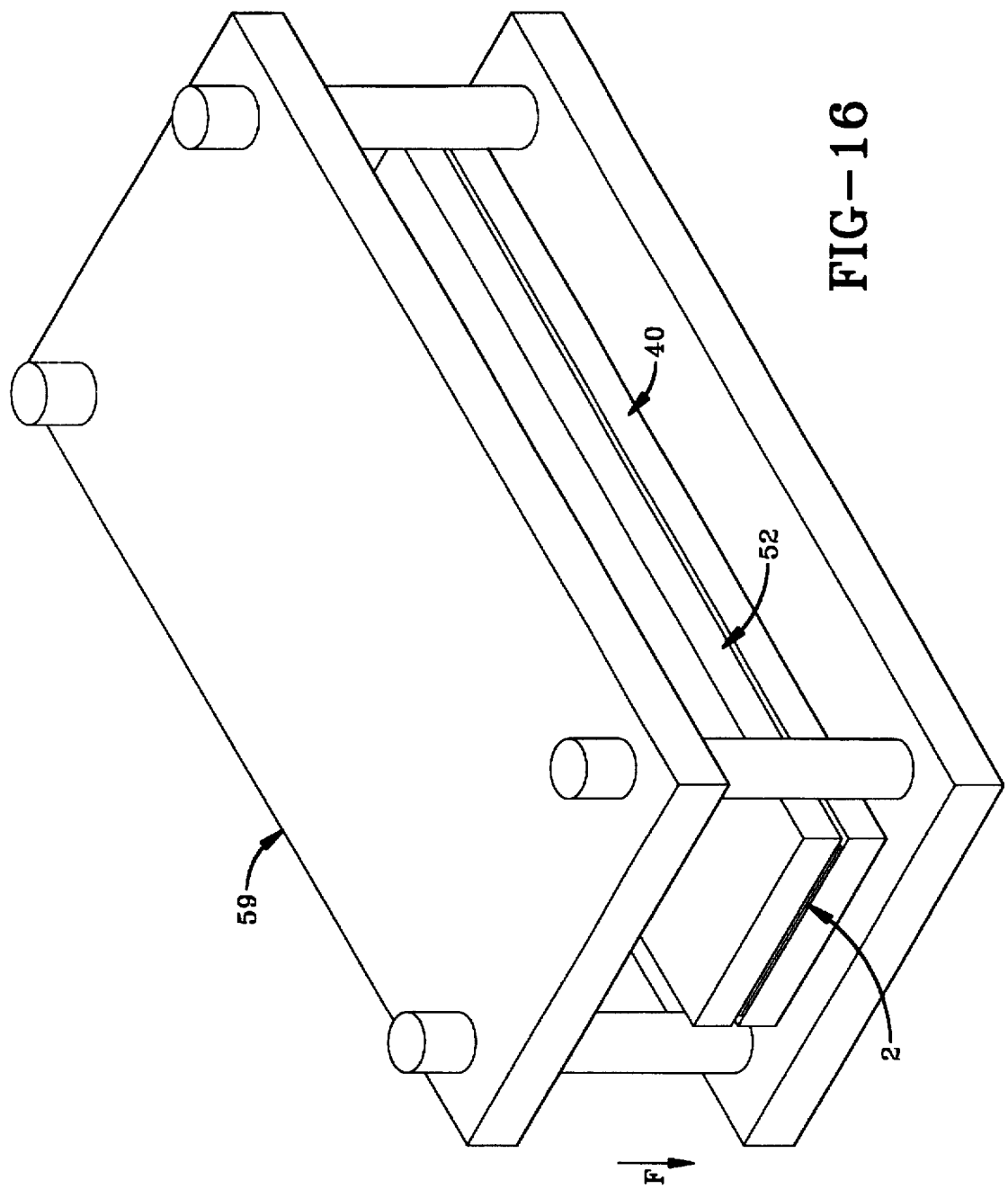
FIG. 16 is a diagrammatic perspective view showing the first and second vacuum plates and reinforced body plies being placed in a press.

Referring to FIG. 15, plate 40 is flipped over or rotated 180° so that layer 3 and cords 5 are on an exposed top surface thereof for receiving thereon second elastomeric layer or strip 4, which is retained on a second vacuum plate 52. Plate 52 is shown in FIGS. 22–22A, and is a generally flat rectangular-shaped plate similar in size and configuration to plates 23 and 40, and is formed with a vacuum chamber 53 having a plurality of holes 54 which communicate with a recessed planar surface 55. An inlet opening 56 communicates with vacuum chamber 53 for applying a negative pressure to the vacuum chamber. A plurality of alignment holes 57 are also formed in plate 52 for mounting the plate in the appropriate transfer mechanism for carrying out the steps of the present invention.

Second elastomeric layer or strip 4 is retained on plate 52 by creating a vacuum thereon, and is moved in the direction of arrows E (FIG. 15), bringing strip 4 into contact and alignment with strip 3 and partially embedded cords 5. Plates 40 and 52 are then placed in a press 59, shown diagrammatically in FIG. 16, which applies pressure, as indicated by arrow F, to partially embed cords 5 in elastomeric strip 4 to form a rectangularly shaped body ply strip, indicated at 58.

Figure 17:
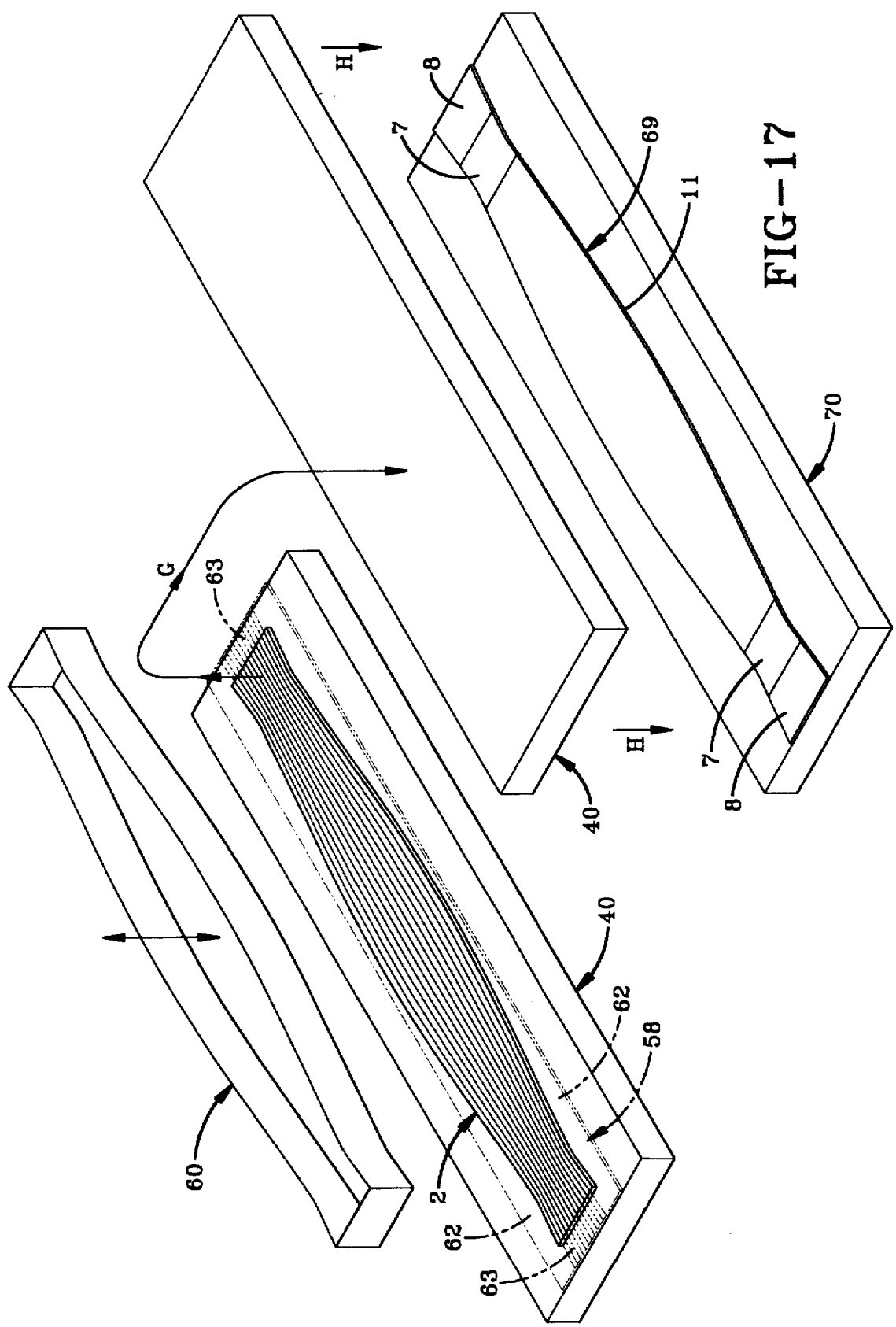
FIG. 17 is a diagrammatic perspective view showing the rectangular-shaped composite reinforced body ply formed in the press of FIG. 16 being trimmed by a cutting mechanism to form a contoured body ply strip, after which the contoured strip and vacuum plate are turned over prior to joinder with a second sidewall member mounted on a third vacuum plate consisting of a second sidewall, innerliner and abrasive gum strips.
Figure 18:
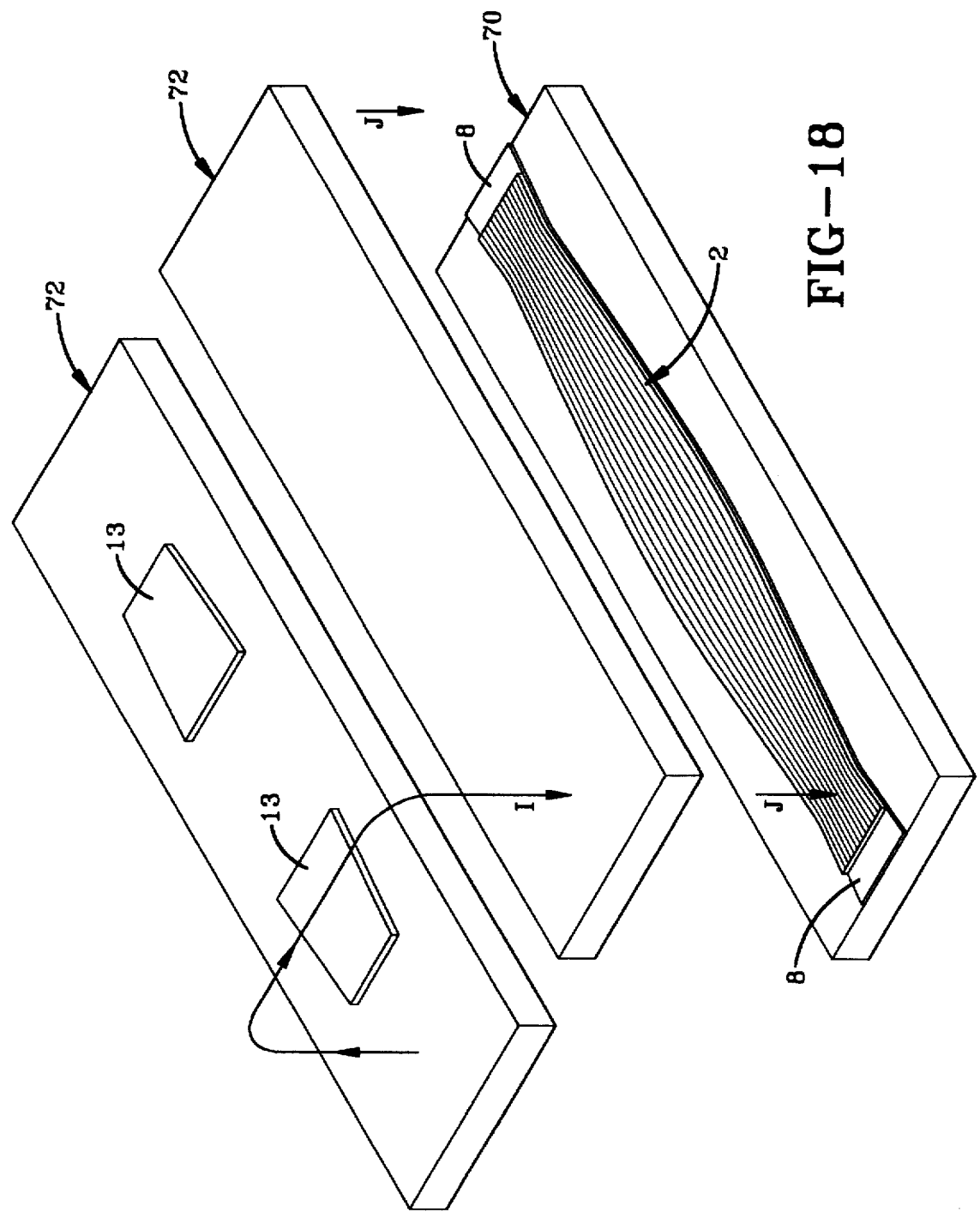
FIG. 18 is a diagrammatic perspective view showing the step of applying a pair of first sidewall members retained in a fourth vacuum plate to the composite sidewall strip formed by the method step shown in FIG. 17.

Referring to FIG. 17, plate 52 is removed and body ply strip 58 remains secured to plate 40 by the vacuum. A cutter mechanism 60, which may be a cookie-type cutter, as shown in the drawings, or other type of cutting mechanism, is brought into contact with rectangular-shaped body ply strip 58, and forms the contoured body ply strip 2, discussed previously above, by moving longitudinal strips of unwanted material 62 from the previously formed rectangular body ply strip 58.

Cutter 60 preferably has the particular contoured shape desired to be imparted to body ply strip 2, and will also cut end portions 63 from strip 58 to provide strip 2 with the desired longitudinal length. Cutter 60 is shown in FIGS. 23-23A, and will include a generally rectangular flat planar block 65 having a plurality of alignment posts 66 and a contoured cutting blade 67 formed thereon. As indicated above, blade 67 preferably has the contoured configuration to form the desired configuration of body ply strip 2.

Next, strip 2 is flipped or rotated 180°, as shown by arrow G in FIG. 17, and is brought into juxtaposition with a third vacuum plate, indicated generally at 70. A preassembled composite strip 69 is placed on vacuum plate 70 and consists of innerliner 10, abrasive gum sections 7, and first sidewall sections 8, discussed previously above. Sections 7 and 8 are mounted on the ends of innerliner strip 10, as shown in FIGS. 2 and 17. These components are secured to plate 70 by a vacuum. The details of plate 70 are not shown, but will have a generally similar construction as discussed above with respect to vacuum plates 40 and 52.

Plate 40 containing body ply 2 is brought into engagement with plate 70, as shown by arrows H, FIG. 17, which will press strip 2 against composite strip 69. Plate 40 is removed, leaving body ply 2 in engagement with composite strip 69, having the particular configuration shown in FIG. 18, with the first sidewall sections 8 extending partially beyond the ends of body ply 2. A pair of the second sidewall sections 13 are placed on a fourth vacuum plate 72, which will have a vacuum-retaining chamber (not shown) formed therein for holding body ply sections 13 on the plate, enabling plate 72 to be flipped or rotated 180°, as shown by arrow I, where it is located above plate 70. Next, the joined composite strip 69 and body ply 2 are brought into pressing engagement with sidewall sections 13, as shown by arrows J. This pressure engagement may be applied by a press similar to that shown in FIG. 16, and will secure second body ply sections 13 in the desired position on body ply strip 2, as shown in FIG. 19, forming the tire carcass strip 1, discussed previously above.

Figure 19:
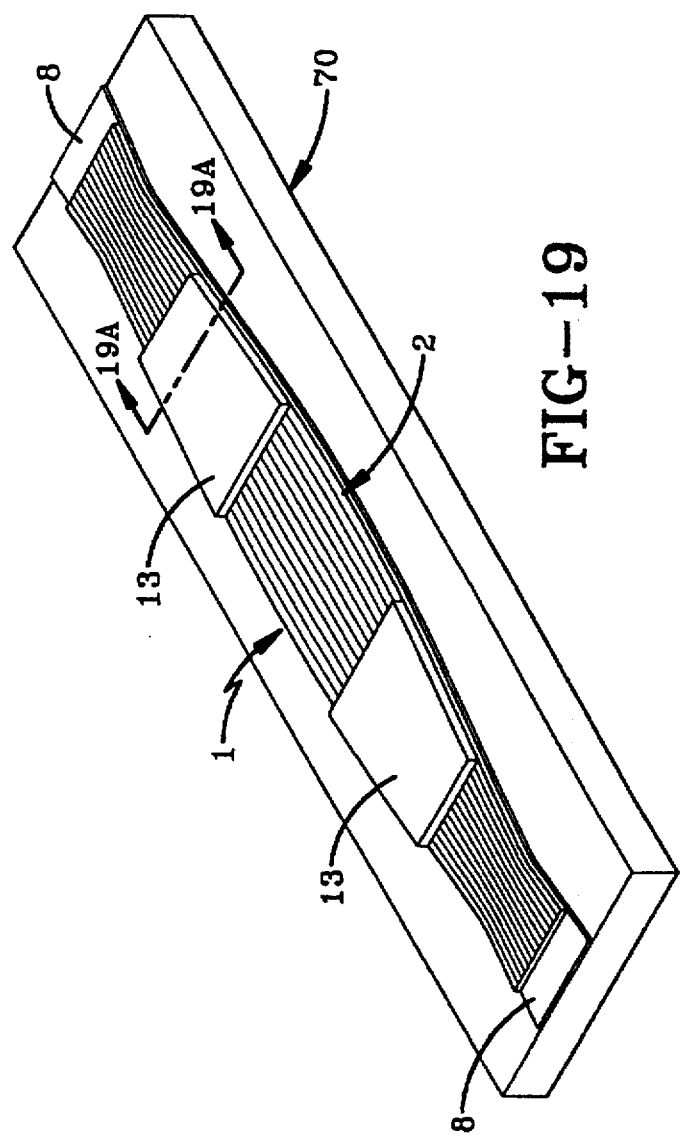
FIG. 19 is a diagrammatic perspective view of the multi-layer strip formed by the method of manufacture of FIGS. 5–18, a top plan view of which is shown in FIG. 1.

Strip 1 then can be transported to any desired location on vacuum plate 70, or removed therefrom, with the natural tackiness of the green elastomeric materials, which has been applied preferably under some pressure to each other, to remain assembled in the particular configuration shown particularly in FIGS. 1 and 19. Thus, a plurality of strips 1 can be produced by repeating the cycle and method steps discussed above, which strips then can be transferred to a remote site and stored conveniently for future use in the formation of a pneumatic tire, several examples of which are shown in FIGS. 24-30 discussed below.

Figure 19A:
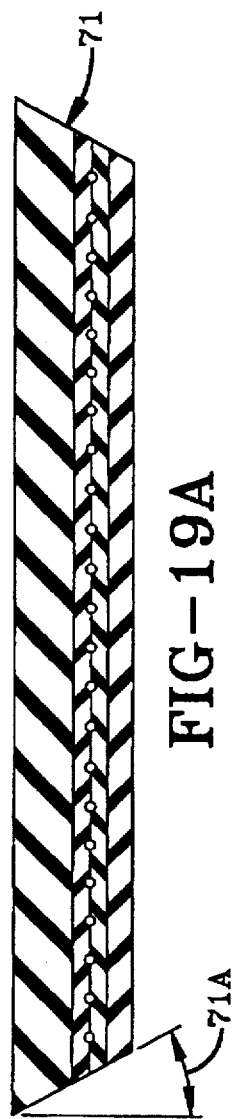
FIG. 19A is a greatly enlarged sectional view taken on line 19A–19A of FIG. 19.

It is readily understood that cutter 60, shown particularly in FIG. 17, could be replaced with other types of cutting mechanisms in which to form the final configuration of the contoured strip. Also, the particular components could be cut at various steps throughout the forming process without affecting the concept of the invention and need not be cut at the particular stage of the method as shown in FIG. 17. For example, a modified cutter or a pair of cutters could cut strip 2 therebetween in order to provide an angled side wall effect thereto, as shown in FIG. 19A. The angled side walls, as indicated generally by 71, have a predetermined angle 71A which enables a plurality of the strips when laid side by side on a curved mandrel, as discussed herein below, to ensure that the adjacent side walls are in continuous contact instead of creating a gap therebetween, as could occur if the side walls were straight, especially with thicker strip material. The angle of cut will substantially conform to and align with the radius of curvature of the mandrel, which prevents the formation of gaps, as a plurality of the formed strips are placed about the circumference of the mandrel.

FIG. 24 shows diagrammatically one type of tire-building machine, indicated generally at 73, on which strips 1 may be used for forming a green tire carcass. Machine 73 consists of a toroidal-shaped mandrel 74 which is moved into engagement by a pressure transfer mechanism 75 toward a supporting disc 76 having an annular bead assembly, indicated generally at 77, mounted thereon. Bead assembly 77 is shown in FIG. 2 and consists of a usual band or bundle of wire cables 78 or other type of reinforcing bead bundle, together with a bead apex 79. Movement of mandrel 74 toward disk 76 in the direction of arrow K, will join the bead assembly to the toroidal-shaped tire carcass, which is formed by a plurality of strips 1 which are placed in an abutting side-by-side relationship on mandrel 74, only four of which are shown in FIG. 24. Bead assembly 77 will be positioned on body ply 2, as shown in FIG. 2, adjacent each of the second sidewall sections 13, with abrasive gum sections 7 and first sidewall sections 8 being turned up around bead assembly 77 by the tire-building equipment 73 to form the particular tire carcass, an end portion of which is shown in FIG. 4.

FIG. 25 shows diagrammatically a side view of two strips 1 placed on segmented collapsible mandrel 74, which consists of a plurality of segments 81 and 82, which are collapsible for removal of the toroidal green tire carcass formed by the tire-building machinery of FIG. 24, after a complete toroidal carcass is formed by a plurality of strips 1. FIG. 26 shows the next step of the tire-manufacturing procedure in which the toroidal green tire carcass, indicated at 84, which is formed by machine 73, is placed in a segmented mold, indicated generally at 85, and has a tread/belt assembly 86 brought into engagement with carcass 84, as shown by arrow L.

FIG. 27 shows another type of toroidal mandrel, indicated at 88, which can be utilized for forming green tire carcass 84, wherein the mandrel consists of a pair of sections 88a and 88b which are expanded outwardly from the position of FIG. 27 to that of FIG. 28 by an outwardly extending mandrel section 90. Thus, a plurality of tire carcass strips 1 are placed in an abutting relationship, as shown in FIG. 25, forming a complete toroidal configuration about expanded mandrel 88, after which the green tire carcass is placed in a mold, such as mold 85 of FIG. 26, where a tread/belt assembly 86 is joined therewith. After molding of the tire, mandrel section 90 is retracted to the position as shown in FIG. 27, facilitating the removal of the formed tire from the mandrel.

Another type of toroidal mandrel, indicated at 92, is shown in FIGS. 29 and 30, which consists of an inflatable air bag 93, having an air-impervious innerliner 94 which, when expanded outwardly into the position shown in FIG. 30, forms a toroidal mandrel for placement of the required number of tire carcass strips 1 thereon for forming green tire carcass 84. Carcass 84 then is placed in a mold and joined with a tread/belt assembly 86 for forming the finished pneumatic tire.

Thus, in accordance with the invention, a unique contoured tire carcass strip 1 is formed by a unique manufacturing process, which ensures that the individual reinforcing cords are positively retained in the desired configured spacing, enabling them to be accurately positioned and embedded between a pair of elastomeric strips to form body ply 2, which is then combined with the other components of a tire carcass, namely, innerliner 10, a pair of abrasive gum sections 7, and first and second sidewall sections 8 and 13, which are then laid upon a toroidal mandrel in abutting relationship with respect to each other for forming a green tire carcass which then can subsequently be joined with a tread/belt assembly. This method produces a plurality of uniform, consistent tire carcass strips 1, wherein the reinforcing cords retain their position and are unaffected when placed on the mandrel, as could occur in prior tire-building machinery where the mandrel expands the laid-up elongated strips of tire-building materials when forming the green tire carcass.

The portions of the apparatus shown in the drawings and described above for forming tire carcass strips 1 may be modified and are shown diagrammatically, and will be incorporated into other types of mechanisms for automating the entire process of forming tire carcass strips 1 in order to provide a method which is commercially viable in producing strips 1 and the subsequent green tire carcass 84.

Accordingly the improved method and apparatus is simplified, and provides an effective, safe, inexpensive, and efficient means to achieve all of the enumerated objectives, provides for eliminating difficulties encountered with prior methods and apparatus, and solves problems and obtains new results in the art.

In the foregoing description, certain terms have been used for brevity, clearness and understanding; but no unnecessary limitations are to be implied there from beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved method and apparatus for making contoured strips containing reinforcing cords is constructed and used, the characteristics of the construction and method steps, and the advantageous, new and useful results obtained; the new and useful structures, devices, elements, arrangements, parts, method steps and combinations, are set forth in the appended claims.

We claim:

1. A method of forming a contoured body ply strip of elastomeric material for use in forming a tire carcass strip, said body ply strip containing reinforcing cords embedded in the elastomeric material and having a central portion and outwardly flared end portions separated from said central portion by intermediate portions, said method including the steps of:
   a) providing first and second strips of elastomeric material;
   b) providing a grooved forming plate having a groove pattern formed therein by a plurality of grooves extending longitudinally in one surface of the plate wherein the groove pattern has a contoured configuration that the cords will take when embedded in the elastomeric material;
   c) placing a plurality of individual reinforcing cords into the grooves of the forming plate to accurately position and space the cords;
   d) bringing substantially the entire area of the first strip of elastomeric material transversely into pressure contact with the spaced cords while the cords are in the grooves of the forming plate and partially embedding the cords substantially simultaneously in said first strip of elastomeric material;
   e) removing the first strip of elastomeric material containing the embedded cords from the forming plate; and
   f) bringing substantially the entire area of the second strip of elastomeric material transversely into pressure engagement with the embedded cords and first strip, partially embedding the cords substantially simultaneously in said second strip to form the body ply.

2. The method defined in claim 1 including the step of trimming the body ply into the contoured configuration of the tire carcass strip.

3. The method defined in claim 1 including the step of securing the first and second strips of elastomeric material on first and second vacuum plates, respectively, when bringing said strips into contact with the, cords in the grooved forming plate.

4. The method defined in claim 3 including the step of placing the first and second vacuum plates in a press to form the body ply.

5. The method defined in claim 4 including the step of removing longitudinal edge portions of the first and second strips of elastomeric material while the body ply remains on one of the vacuum plates, whereby said body ply is contoured to match the contour of the reinforcing cords embedded therein.

6. The method defined in claim 1 including the step of maintaining the transverse distances between the cords equal, with said distances being greater at the central portion of the strip than at the two end portions and greater at the two end portions than at the two intermediate portions.

7. A method of forming a contoured body ply strip of elastomeric material for use in forming a tire carcass strip, said body ply strip containing reinforcing cords embedded in the elastomeric material and having a central portion and outwardly flared end portions separated from said central portion by intermediate portions, said method including the steps of:
   a) providing first and second strips of elastomeric material;
   b) providing a grooved forming plate having a groove pattern formed therein by a plurality of grooves extending longitudinally in one surface of the plate wherein the groove pattern has a contoured configuration that the cords will take when embedded in the elastomeric material;

c) placing a plurality of individual reinforcing cords into the grooves of the forming plate to accurately position and space the cords;

d) bringing substantially the entire area of the first strip of elastomeric material transversely into pressure contact with the spaced cords while the cords are in the grooves of the forming plate and partially embedding the cords substantially simultaneously in said first strip of elastomeric material;

e) removing the first strip of elastomeric material containing the embedded cords from the forming plate;

f) bringing substantially the entire area of the second strip of elastomeric material transversely into pressure engagement with the embedded cords and first strip, partially embedding the cords substantially simultaneously in said second strip to form the body ply;

g) assembling a composite strip containing an innerliner and a pair of first side wall sections; and h) bringing the body ply transversely into pressure contact with the composite strip to form the contoured tire carcass strip.

8. The method defined in claim 7 including the step of placing a pair of abrasive gum sections on the composite strip prior to bringing said composite strip into contact with the body ply.

9. The method defined in claim 8 including the step of bringing a pair of second sidewall sections into contact with the body ply when forming the contoured tire carcass strip.

10. The method defined in claim 9 including the step of trimming at least the first and second sidewall sections of the tire carcass strips with angled walls substantially aligning with the radius of the toroidal mandrel.

11. The method defined in claim 9 including the step of forming the second sidewall sections with a truncated configuration substantially matching the configuration of spaced portions of the body ply.

12. The method defined in claim 8 including the step of placing a plurality of the tire carcass strips in juxtaposition to each other on a toroidal mandrel to form the carcass of a pneumatic tire.

13. The method defined in claim 12 including the step of bringing a pair of tire bead assemblies into contact with the intermediate portions of said strips and then turning the abrasive gum sections and first sidewall sections of said strips around the bead assemblies to form a toroidal tire carcass.

14. The method defined in claim 13 including the step of placing the toroidal tire carcass into a tire-forming mold containing a strip of tread material, and then molding the tread strip to the carcass to form a pneumatic tire.

15. The method defined in claim 12 including forming the mandrel from a plurality of collapsible arcuate segments.

16. The method defined in claim 12 including the step of forming the mandrel from a collapsible air bag.

17. The method defined in claim 7 including the step of forming the first sidewall sections with a truncated configuration; and in which said first sidewall sections extend beyond the body ply.

18. The method defined in claim 7 including the step of securing the composite strip on a vacuum plate when bringing said composite strip into contact with the body ply.

* * * * *